United States Patent
Arai

[19]

[11] Patent Number: 6,049,649
[45] Date of Patent: Apr. 11, 2000

[54] SURFACE LIGHT SOURCE DEVICE OF SIDE-LIGHT TYPE

[75] Inventor: Takayuki Arai, Kasukabe, Japan

[73] Assignees: Enplas Corporation, Kawaguchi; Yasuhiro Koike, Yokohama, both of Japan

[21] Appl. No.: 08/823,488

[22] Filed: Mar. 25, 1997

[30] Foreign Application Priority Data

Mar. 28, 1996 [JP] Japan .................................. 8-097329

[51] Int. Cl.[7] ...................................................... G02B 6/10
[52] U.S. Cl. ........................... 385/133; 359/251; 349/62; 353/81; 362/31
[58] Field of Search ............................... 385/133; 362/31; 349/5, 62, 82; 359/455–456, 619, 40, 251; 353/81

[56] References Cited

U.S. PATENT DOCUMENTS

| | | | |
|---|---|---|---|
| 5,396,350 | 3/1995 | Beeson et al. . | |
| 5,428,468 | 6/1995 | Zimmerman et al. . | |
| 5,598,280 | 1/1997 | Nishio et al. | 349/57 |
| 5,598,281 | 1/1997 | Zimmerman et al. | 349/5 |
| 5,671,994 | 9/1997 | Tai et al. | 362/31 |
| 5,841,572 | 11/1998 | Ando et al. | 359/456 |

*Primary Examiner*—Rodney Bovernick
*Assistant Examiner*—Ellen E. Kang
*Attorney, Agent, or Firm*—Staas & Halsey LLP

[57] ABSTRACT

A surface light source device of side-light type enables concentrated output of illumination light to a frontal direction. A flux having clear directivity is outputted from window portions 1w on an emitting surface 5 of a light guide plate 1 with emitting directivity. This flux is represented by a beam C01 outputted in a direction at an angle of 70°. A flux C02 incident on reflection portions 1r is returned to the light guide plate 1 and is given an opportunity of output from the window portions 1w again. The flux C01 having escaped from the window portions 1w to an air layer AR is obliquely incident on flat regions 14g of a propagation direction characteristics modifier 14, and a degree of parallelization of the flux in a propagation direction is improved. The flux is blocked by the reflection portions 1r from being incident on a notch portion (uneffective area) between the flat regions 14g. After total reflection by a total reflection surface 14b of each projection element 14c, the flux is outputted from a flat outside surface 14h to a frontal direction without degrading the improved degree of parallelization. The projection elements 14c may be two-dimensionally arrayed. A prismatic groove or a cylindrical lens array may be formed on the outside surface 14h to two-dimensionally enhance the degree of parallelization.

11 Claims, 23 Drawing Sheets

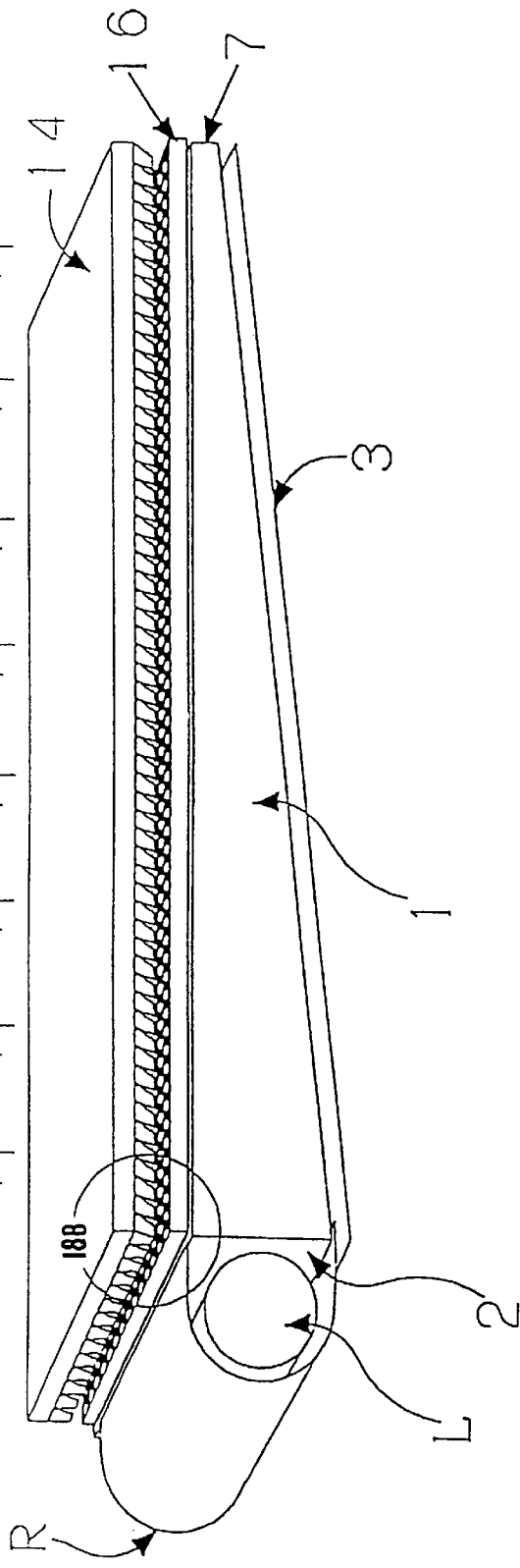
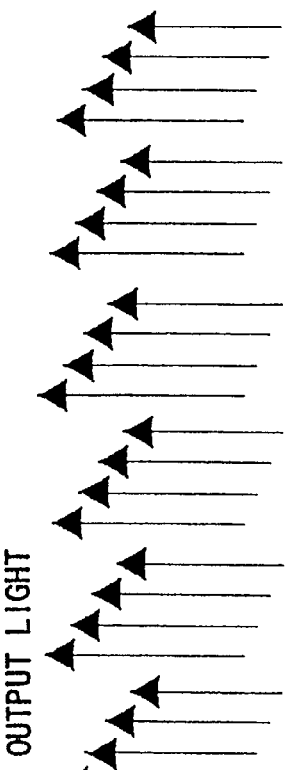
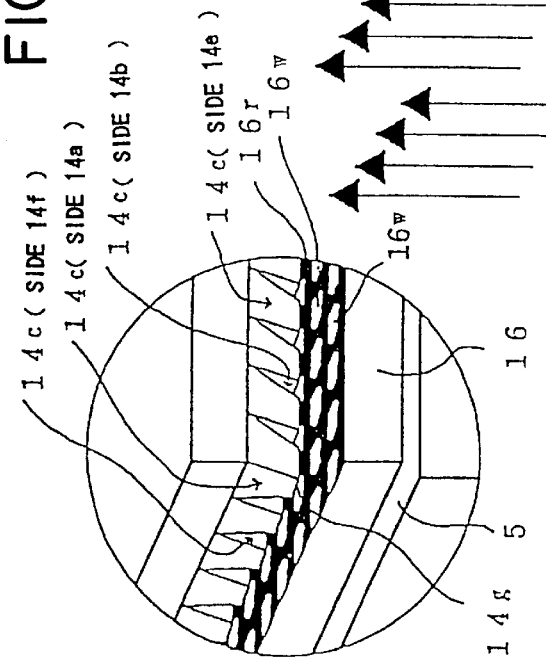

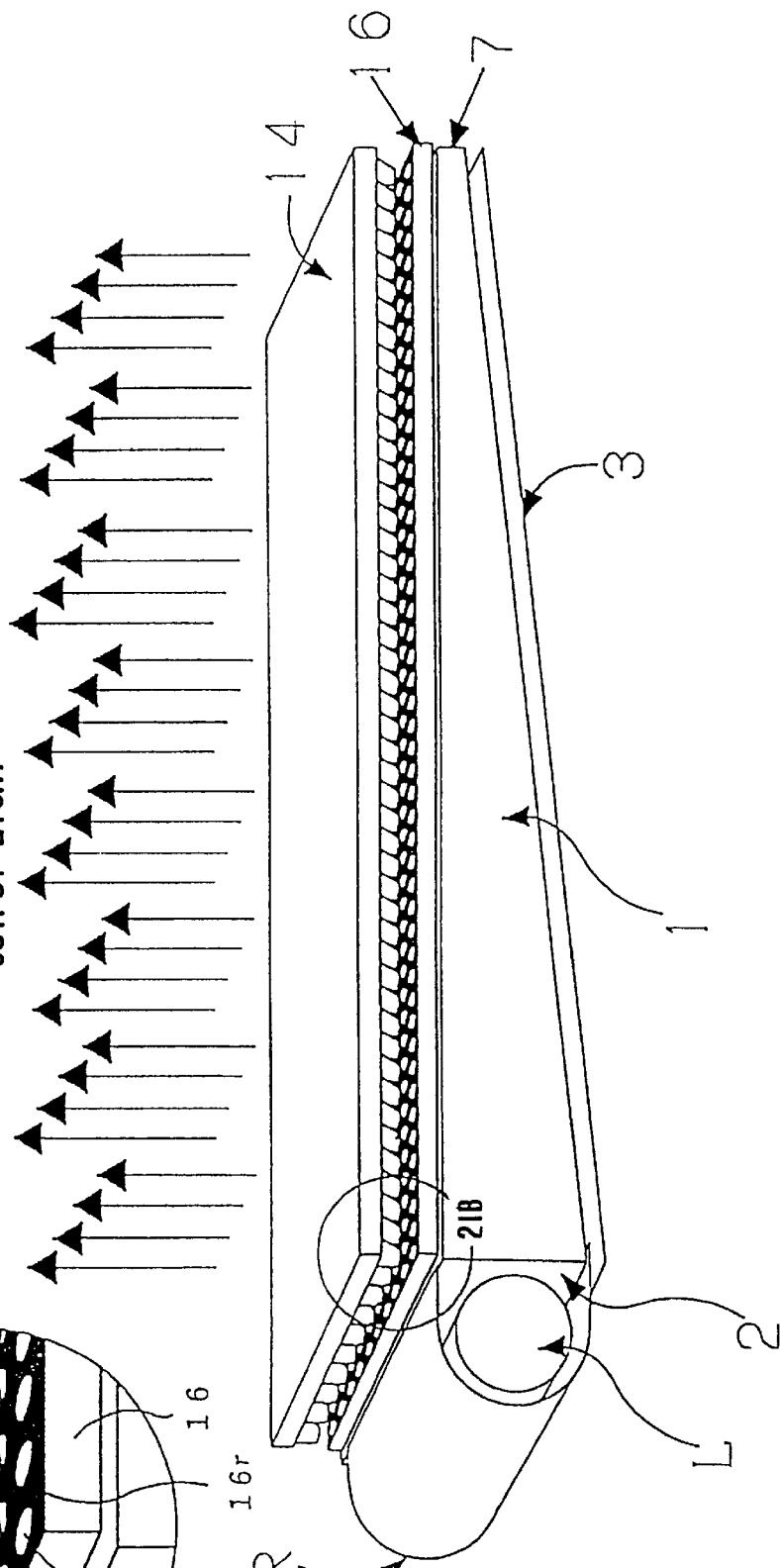

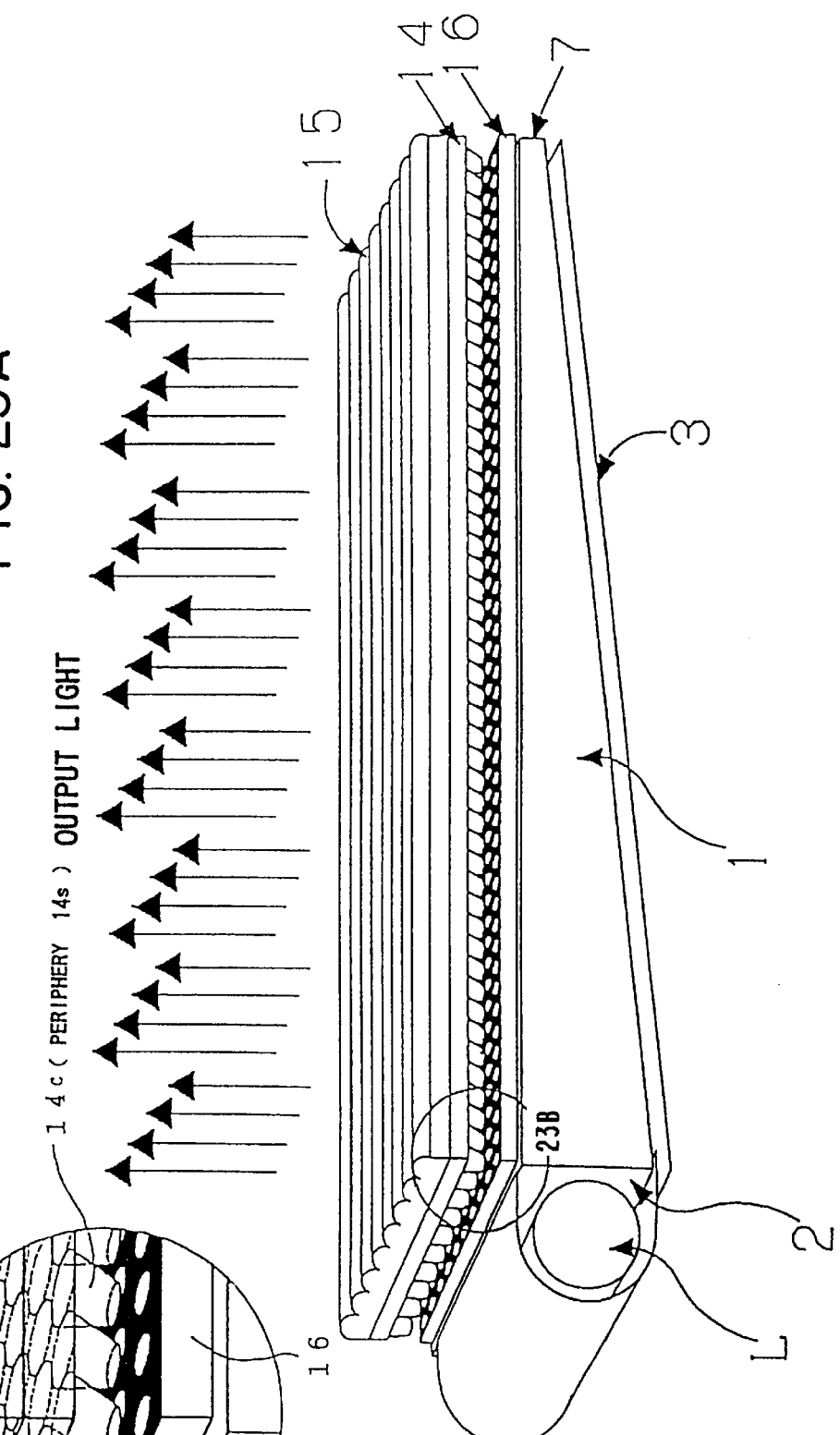

SURFACE LIGHT SOURCE DEVICE OF SIDE-LIGHT TYPE

BACKGROUND OF THE INVENTION

This invention relates to a surface light source device of side-light type adopting a light guide plate with emitting directivity and a propagation direction characteristics modifier in combination. The surface light source device of the present invention is effectively applicable to, for instance, a back lighting arrangement in a liquid crystal display requiring an illumination flux concentratively propagating to a frontal direction.

A well-known surface light source device of side-light type has a light source element such as a cold cathode tube disposed on the lateral side of a light guide plate and uses one surface of the light guide plate as an emitting surface. Such a surface light source device has properties of obtaining an illumination flux having a relatively large sectional area in a thin structure, and is widely applied to a back lighting arrangement in a liquid crystal display.

A light scattering and guiding material is well known as a material of the light guide plate. The light scattering and guiding material includes an optical element having scattering power obtained by distributing a microscopic structure of uneven refractive index inside a transparent optical material. The light guide plate made of the light scattering and guiding material is called a light scattering light guide plate. In general, a surface light source device of side-light type adopting the light scattering light guide plate has the advantage of obtaining a high efficiency of light utilization in a simple structure.

Unless the microscopic structure of uneven refractive index inside the light scattering light guide plate is made excessively small in size, clear directivity is added to an output flux from an emitting surface. A light guide plate meeting the above requirement is called "a light guide plate with emitting directivity" in the present specification.

According to Debye's theory of scattering, the size of the structure of uneven refractive index distributed inside the light scattering and guiding material may be represented in terms of a correlation distance a. The requirement of correlation distance $a \geq 0.06$ constitutes one practical criterion to exert clear emitting directivity in the light scattering and guiding material.

In addition to the light scattering light guide plate described above, a light guide plate having a large number of fine irregularities provided on a surface of a transparent plate to restrain total reflection is well known as the light guide plate with emitting directivity applicable to the surface light source device of side-light type. The irregularities may include numberless fine irregularities on the surface of the light guide plate itself or numberless fine particles fixed to a flat surface of a transparent plate with a light transmitting binder.

In the surface light source device of side-light type adopting the light guide plate with emitting directivity, extremely high luminance is obtained when an emitting surface is observed from a direction coincident with its directivity. However, a problem in this case is the fact that a main propagation direction, that is, "a preferential propagation direction" of an output flux from the emitting surface of the light guide plate with emitting directivity is largely deviated from a frontal direction of the emitting surface.

FIG. 1 is a graph illustrating the above fact, and angle characteristics of the intensity of output light in the surface light source device of side-light type adopting the light guide plate with emitting directivity are plotted. The conditions of measurement in this graph are as schematically shown in FIG. 2. A light guide plate 1 used in the surface light source device to be measured is made of a light scattering and guiding material having a wedge-like sectional shape. This light scattering and guiding material has a matrix consisting of polymethyl methacrylate (PMMA having refractive index of 1.492), the numberless fine particles of refractive index different from that of the matrix are uniformly distributed in the matrix.

A silicone resin material (Tospearl 120: registered trademark/manufactured by Toshiba silicone Co., Ltd.) is distributed as the fine particles in the light guide plate 1 at a rage of 0.03 wt %.

As shown in the drawing, the light guide plate 1 is sized to be 180 mm in depth as viewed from the side of an incidence surface 2, 135 mm in width, 2.5 mm in thickness on the side of the incidence surface 2, and 0.5 mm in thickness on the side of an end surface 7. A straight tube-like lamp L (a cold cathode type having a diameter 1 of 2.4 mm) is disposed at a distance of 1.0 mm from the incidence surface 2 of the light guide plate 1. The lamp L is surrounded from the rear by a reflection sheet R consisting of silver foil in order to prevent light from being scattered and lost. A silver foil sheet is disposed as a reflector 3 along a back surface 6 of the light guide plate 1. A thin air layer (having a thickness of δ1) is present between the silver foil sheet 3 and the back surface 6.

In FIG. 2, reference symbol M denotes a luminance meter (LS110 manufactured by Minolta, having a visual field angle of ⅓° in measurement, and mounted with a close-up lens) used for measurement of luminance. In measurement with the luminance meter M, an observation of a central point P on the emitting surface 5 was made though a line of sight b at a distance of 203 mm from the central point. Then, the line of sight b was scanned by turning within a plane perpendicular to the lamp L. In the abscissa of the graph, a direction of the line of sight b is represented in terms of an output angle φ (°). COS-corrected relative luminance values (%) to a peak value are plotted on the ordinate.

COS correction is made for compensating an emitting surface area corresponding to output light incident on the luminance meter for COS-functionally varying depending on the angle of the line of sight. COS correction is also applied to other graphs which will be described later.

As is read from the graph of FIG. 1, a sharp peak (a preferential propagation direction) is observed in a direction of an angle slightly lower than 80°. In view of such a fact, a surface light source device of side-light type adopting the light guide plate with emitting directivity will need to modify a preferential propagation direction of output light from the emitting surface. In particular, when this surface light source device is applied to a back lighting arrangement in a liquid crystal display, it is necessary to modify the preferential propagation direction to a frontal direction which is the most general direction of observation.

An element called a prism sheet has been conventionally used to modify the preferential propagation direction. As a known arrangement of the prism sheet, there are a prism sheet arrangement, in which a prism surface is faced inwards (is opposed to the emitting surface), and a prism sheet arrangement, in which a prism surface is faced outwards (turns its back on the emitting surface).

FIG. 3 is a sketch showing a basic arrangement of a surface light source device adopting the former arrangement. This arrangement is provided by adding the prism sheet to the arrangement shown in FIG. 2 (an illustration of the conditions of measurement), and a reference numeral of each element is also used in common.

A prism sheet 4 is disposed on the outside of an emitting surface 5 of a light scattering light guide plate 1 with emitting directivity having a wedge-like sectional shape. The prism sheet 4 includes a light transmitting sheet having a surface provided with a large number of prism rows at fine pitches and a flat surface 4e. Each prism row is composed of a pair of slopes 4a, 4b.

A plastic material such as polycarbonate is usually used as a material of the prism sheet. As a matter of convenience, a distance between the prism sheet 4 and the emitting surface 5 and a pitch of prism rows are exaggerated in FIG. 3 and other drawings.

When the surface light source device is applied to a back lighting arrangement in a liquid crystal display, a well-known liquid crystal display panel is disposed on the further outside of the prism sheet 4. Since the light guide plate 1 has a wedge-like sectional shape, it is advantageous in improving a luminance level and ensuring uniformity in luminance. An action based on such a shape of the light guide plate is disclosed in Japanese Patent Laid-open No. 7-198956, for instance.

Light supplied from the lamp L to the light guide plate 1 is guided toward an end surface 7 on the thin side while being affected by a scattering action and a reflecting action in the light guide plate 1. In the process, illumination light is outputted little by little from the emitting surface 5. As described above, the output light from the emitting surface 5 of the light guide plate 1 with emitting directivity has a clear preferential propagation direction 5a. The preferential propagation direction 5a is inclined at an angle of about 60 to 80° with respect to a normal extending from the emitting surface 5, as illustrated in the graph of FIG. 1.

The output light from the emitting surface 5 in the preferential propagation direction 5a is introduced into the inside surfaces 4a, 4b of the prism sheet 4 and is outputted from the outside surface 4e to around a frontal direction. As a result, the preferential propagation direction is modified. A description of this modifying action will be given as follows with reference to FIG. 4.

FIG. 4 is a view for explaining the behavior of light in a section orthogonal to the lamp L in the arrangement shown in FIG. 3. In this case, "a direction orthogonal to the lamp L" means "a direction perpendicular to a running direction of the lamp L", that is, "a direction perpendicular to a running direction of the incidence surface 2". Hereinafter, it will be simply referred to as "orthogonal to the lamp". Similarly, "a direction parallel to a running direction of the lamp L", that is, "a direction parallel to a running direction of the incidence surface 2" will be referred to as "parallel to the lamp".

The prism sheet 4 is disposed inwardly along the emitting surface 5. This arrangement is briefly called an arrangement "with grooves inwards". Each prism unit forming the prism surfaces has an isosceles triangular section. Its apex angle is represented by $\phi 3$. A direction of incidence is given by an arrow L', and a preferential propagation direction of an output flux from the emitting surface 5 is represented in terms of an output angle $\phi 2$. As described above, the angle $\phi 2$ is generally sized to be in the range of about 60 to 80°.

The light guide plate 1 having PMMA matrix has refractive index of about 1.5, and an incidence angle $\phi 1$ of light propagating from the inside to the emitting surface 5 is sized to be slightly lower than 40°. A beam defined by such an incidence angle $\phi 1$ and an output angle $\phi 2$ is represented by a typical beam B1. In general, the typical beam corresponds to a beam propagating in a preferential propagation direction.

After the typical beam B1 outputted from the emitting surface 5 makes a straight propagation through an air layer AR (having refractive index n0 of 1.0), this typical beam B1 is incident on the slope 4a of the prism sheet 4 at substantially right angles therewith and is affected by a refractive action to some extent. It is to be noted that the beam B1 is incident on the slope 4b opposite to the slope 4a at a relatively small rate.

The typical beam B1 further makes a substantially straight propagation through the prism sheet 4 up to its slope 4b, and is regularly reflected (totally reflected) by the slope 4b, resulting in being incident on the flat surface 4e of the prism sheet 4 from the inside. When the prism apex angle $\phi 3$ is appropriately designed according to the output angle $\phi 1$ and the refractive index n2 of the prism sheet 4 and so on, the incidence angle with respect to the flat surface 4e comes to be about 0°, and a beam 4f leading to around a frontal direction (at an angle $\phi 4$ of about 90°) is generated.

In this manner, the preferential propagation direction is completely modified to the frontal direction. In this arrangement, the prism sheet 4 functions as a deflecting element for an output flux represented by the typical beam B1, whereas it hardly functions as a converging element which narrows diffusion of the propagation direction of an output flux from the emitting surface 5. That is, a flux is sufficiently deflected whereas an action for converging the flux to improve a degree of parallelization in a propagation direction is hardly expected.

Although a propagation of light from a medium of low refractive index to a medium of high refractive index is applied to incidence of light on the prism sheet 4 through the air layer AR, the light is incident on the slope 4a at substantially right angles therewith as described above. Under these conditions, a converging action is hardly caused. The converging action is not caused even through a process of propagation in the prism sheet 4 or a process of reflection by the inside surface of the slope 4b.

In output of light from the flat surface 4e of the medium of high refractive index, diffusion of light occurs on the contrary. However, output of light at substantially right angles causes a low diffusing action from the reasons similar to those in case of incidence of light on the slope 4a.

An arrangement with prism surfaces facing outwards has been proposed in order to fulfill the converging action in the prism sheet 4. FIG. 5 is a sectional view for explaining the behavior of a typical beam in case of adopting the above arrangement.

Reference numerals 4c, 4d respectively denote slopes forming the outward prism surfaces, and 4g denotes an inward flat surface. The flat surface 4g is parallel to the emitting surface 5. This arrangement is briefly called an arrangement "with grooves outwards". A prism row serving as a prism unit of the prism sheet 4 having an apex angle $\phi 5$ has an isosceles triangular section. With respect to inclination angles $\phi 6$, $\phi 7$ of the slopes 4c, 4d, $\phi 6$ is sized to be equal to $\phi 7$.

Similarly to the case of FIG. 4, a direction of incidence is given by an arrow L', and a typical beam is represented by B2. The typical beam B2 is incident on the emitting surface 5 at an inside incidence angle $\phi 1$ slightly lower than 40°, and most of the beam is outputted to an air layer AR (having refractive index n0 of 1.0). An output angle φ2 in this case is sized to be in the range of about 60 to 80°, as described above.

After the typical beam B2 outputted from the emitting surface 5 makes a straight propagation through the air layer AR, this typical beam B2 is obliquely incident on the flat surface 4g of the prism sheet 4, and is outputted from the surface 4c or 4d of the prism sheet 4 through refractive paths P1, P2 as shown in the drawing. When the prism apex angle φ5 is appropriately designed according to the output angle φ2 of the beam from the emitting surface 5 and the refractive index n2 of the prism sheet 4, a propagation direction of output light 4f may be modified close to a frontal direction.

According to this arrangement, an action for converging a flux to a frontal direction may be fulfilled by (1) the fact that light is incident on the flat surface 4g parallel to the emitting surface 5 and (2) a function of the prism surfaces 4c, 4d as a kind of convex lens array.

The fact described in (1) may be generalized as follows.

If a light transmitting element having a flat surface is disposed such that the flat surface faces inwards and is parallel to the emitting surface 5, a flux obliquely incident on the flat surface is affected by a kind of converging action. A description of this fact will be simply given with reference to FIG. 6.

Referring to FIG. 6, a light transmitting element 10 having a flat surface 11 is disposed along an emitting surface 5 of a light guide plate 1 (having refractive index of 1.492) with emitting directivity as shown in the graph of FIG. 1. This light transmitting element 10 includes a flat plate (having refractive index of 1.492) made of PMMA, for instance. The flat surface 11 of the flat plate 10 is parallel to the emitting surface 5, and an air layer AR (having refractive index of 1.0) is present between the flat surface 11 and the emitting surface 5.

Now, with respect to a flux represented by a typical beam B10, let's pay attention to a "a partial flux" propagating through the air layer AR in the angle range of 20.0° around the preferential propagation direction. It is estimated from the result of actual measurement in FIG. 1 that such a partial beam is considered to represent most of an output flux from the emitting surface 5. Beams on both sides of the partial flux defined by this angle range are represented by B11, B12. An attempt to trace the beams B10, B11, B12 is made under the conditions of the above refractive index according to Snel's rule.

The results are shown in FIG. 6. The diffusion of a flux in the angle range of 20.1° in the propagation through the air layer AR is narrowed to that in the angle range of 6.9° through a process of refraction at the time of oblique incidence of light on the flat surface 11. In other words, the diffused state of the beams B10, B11, B12 (see reference symbols C to C") in the light guide plate 1 is recovered.

That is, when the flat surface of the light transmitting element formed on the surface of a medium having refractive index higher than that of the air layer AR is disposed in parallel to the emitting surface 5, this flat surface fulfills an action of recovering directivity once reduced due to an escape of light to the air layer AR.

A group of beams denoted by reference numerals C', S represents a situation of beams traced on the basis of a certain incidence point Q on the flat surface 11, and the converging action is more clearly understood from this situation.

While the arrangement "with grooves outwards" shown in FIG. 5 is excellent in utilization of such a converging action, it has difficulty in obtaining a flux deflecting action, in comparison with the arrangement "with grooves inwards" shown in FIG. 4. That is, in the arrangement "with grooves outwards", it is not possible to utilize reflection by the inside surface such as the slope 4b in FIG. 4, and a flux is deflected only by a refracting action in both surfaces of the prism sheet.

That is, under the conditions of the refractive index (refractive index of about 1.5) of generally available materials for the prism sheet and the light guide plate, it is difficult to lead a flux to a frontal direction, even if the prism apex angle φ5 is adjusted.

A graph of FIG. 7 shows the result of actual measurement illustrating this difficulty. With respect to the arrangement "with grooves inwards" and the arrangement "with grooves outwards", angle characteristics of output light intensity are given under the above conditions of measurement (see a description related to FIG. 2). In a graph I, angle characteristics of output light intensity are plotted when a prism sheet having a prism apex angle of 70° in the arrangement "with grooves outwards" is added to an arrangement corresponding to the graph of FIG. 1.

On the other hand, a graph II shows angle characteristics of output light intensity when a prism sheet having a prism apex angle of 66° in the arrangement "with grooves inwards" is added to the arrangement corresponding to the graph of FIG. 1. The ordinate is graduated so as to show relative luminance (%) on condition that a peak in the graph I is defined as 100.

As is read from a comparison between both the graphs, the arrangement "with grooves outwards" in the graph I is substantially excellent in function of convergence, while being inferior in function of deflection to a frontal direction, in comparison with the arrangement "with grooves inwards" in the graph II. A preferential propagation direction of illumination light is deviated from a frontal direction by 20° or more. Such a tendency is generally observed without being limited to the above case.

Therefore, two prism sheets in the arrangement "with grooves outwards" have been generally layered. A graph in FIG. 8 shows the result of actual measurement of angle characteristics of output light intensity when "two prism sheets in layers" are applied. The conditions of measurement are similar to those in FIG. 7.

A graph III shows angle characteristics of output light intensity when two prism sheets, i.e., a prism sheet having a prism apex angle of 66° and a prism sheet having a prism apex angle of 90° in the arrangement "with grooves outwards" are added in layers to the arrangement corresponding to the graph of FIG. 1. A graph II shows angle characteristics when the prism sheet having the prism apex angle of 66° as described in FIG. 7 is used in the arrangement with "grooves inwards". The ordinate is graduated so as to show relative luminance (%) on condition that a peak in the graph III is defined as 100.

As is read from both the graphs, two-layered arrangement "with grooves outwards" is not only substantially excellent in function of convergence, but also in function of deflection to a frontal direction, in comparison with the arrangement "with grooves inwards" in the graph II. In other words, the two-layered arrangement "with grooves outwards" eliminates a deficiency of the function of deflection in the single arrangement" with grooves outwards" shown in FIG. 7.

However, this method arises a problem caused by an overlap of fine grooves of the two prism sheets. That is, two prism sheets in layers have a tendency to generate moire fringes. Further, a fixed phase relation between repetitive grooves of two prism sheets is required for obtaining higher efficiency of light utilization.

SUMMARY OF THE INVENTION

It is an object of the present invention to overcome the problems in the prior art described above. That is, an object of the present invention is to provide a surface light source device of side-light type adopting a propagation direction characteristics modifier which fulfills a function of convergence to improve a degree of parallelization of a flux in a propagation direction, while deflecting an output flux from an emitting surface of a light guide plate with emitting directivity to a frontal direction.

The surface light source device of side-light type according to the present invention solves the above technical problems by disposing the propagation direction characteristics modifier along the emitting surface of the light guide plate with emitting directivity. This light guide plate preferably has a wedge-shaped section having a tendency to decrease a thickness according as a distance from a side end surface is increased. However, since the sectional shape of the light guide plate is not directly related to the essential characteristics of the present invention, the light guide plate may have a plate-like shape.

The propagation direction characteristics modifier used in the present invention has one-dimensional or two-dimensional array of a large number of projection elements each having a distal end provided with a flat region serving as an input surface substantially parallel to the emitting surface of the light guide plate. At least a part of a side portion of each projection element has a reflective deflection surfce having a function of deflection to a frontal direction on the basis of reflection including total reflection. A reflection pattern means includes reflection portions formed in a distributed state so as to restrain a flux outputted with directivity from the emitting surface of the light guide plate from being incident on portions other than the flat regions of the projection elements.

A one-dimensional array of projection elements is typically formed by lining up a large number of ridge elements in parallel to a lamp. In this case, a reflective deflection surface having a function of deflection to a frontal direction on the basis of reflection including total reflection is provided on a side portion relatively distant from the lamp. The reflection portions of the reflection pattern means are distributed in the shape of stripes so as to restrain a flux outputted with directivity from the emitting surface of the light guide plate from being incident on portions other than the flat regions of the ridge elements.

When the projection elements are set in two-dimensional array, the shape of each projection element is selectively determined such that a reflective deflection surface having a function of two-dimensional deflection to a frontal direction on the basis of reflection including total reflection is further provided at least at a part of a side portion of each projection element. Each projection element of such a shape includes a pole-shaped projection, in particular, a square-pole-shaped projection, a conical-shaped projection (including a cylindrical projection).

In case of using the square-pole-shaped projection elements, each square-pole-shaped projection element is provided with three reflective deflection surfaces formed so as to have a function of two-dimensional deflection to a frontal direction on the basis of reflection including total reflection.

In case of using the conical-shaped projection elements, each conical-shaped projection element is provided with a peripheral surface having a function of two-dimensional deflection to a frontal direction on the basis of reflection including total reflection.

The reflection pattern means may specifically take the shape of a reflection pattern sheet disposed between the emitting surface of the light guide plate and the propagation direction characteristics modifier or reflection portions formed in a distributed state on the emitting surface of the light guide plate.

BRIEF DESCRIPTION OF THE DRAWINGS

FIG. 18A is a sketch showing an overall arrangement of an embodiment VII together with an encircled portion shown on an enlarged scale in FIG. 18B;

FIG. 21A is a sketch showing an overall arrangement of an embodiment X together with an encircled portion shown on an enlarged scale in FIG. 21B;

FIG. 23A is a sketch showing an overall arrangement of an embodiment XII together with an encircled portion shown on an enlarged scale in FIG. 23B.

DETAILED DESCRIPTION OF EMBODIMENTS

Figure 2:
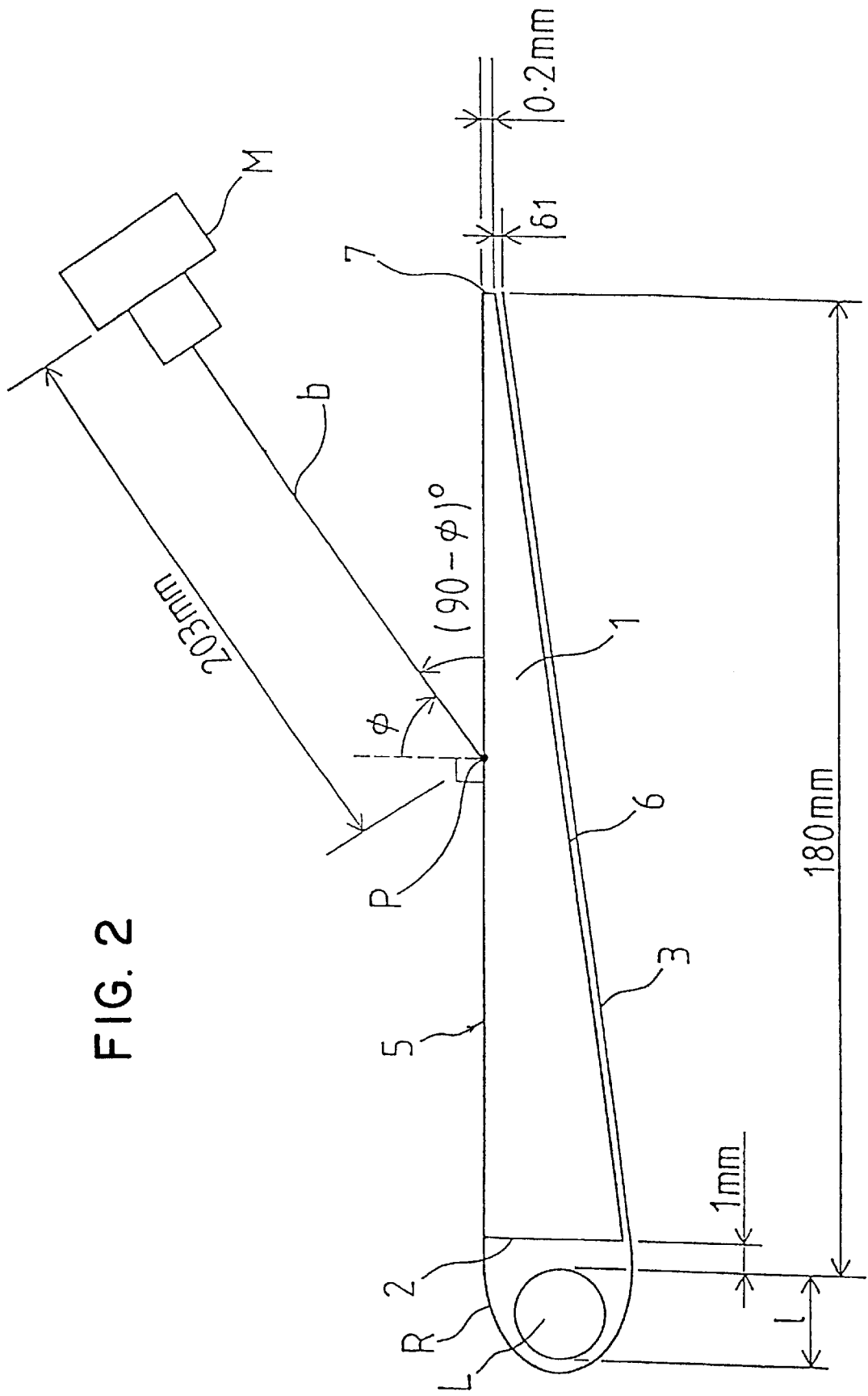
FIG. 2 is a view for explaining conditions of measurement of output light intensity of a light guide plate.
Figure 3:
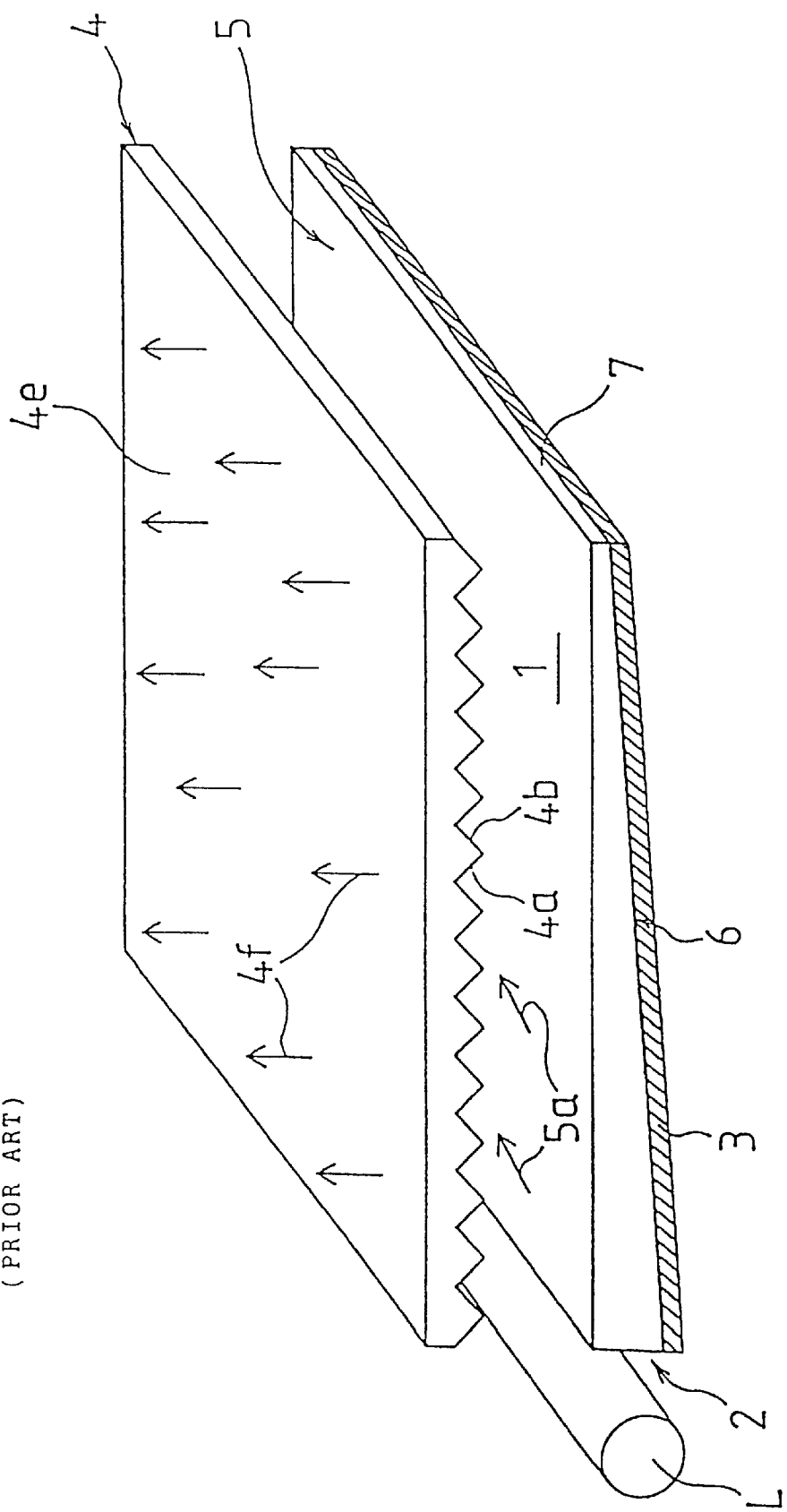
FIG. 3 is a sketch showing a basic arrangement of a surface light source device of side-light type, in which a prism sheet is arranged inwards.
Figure 4:
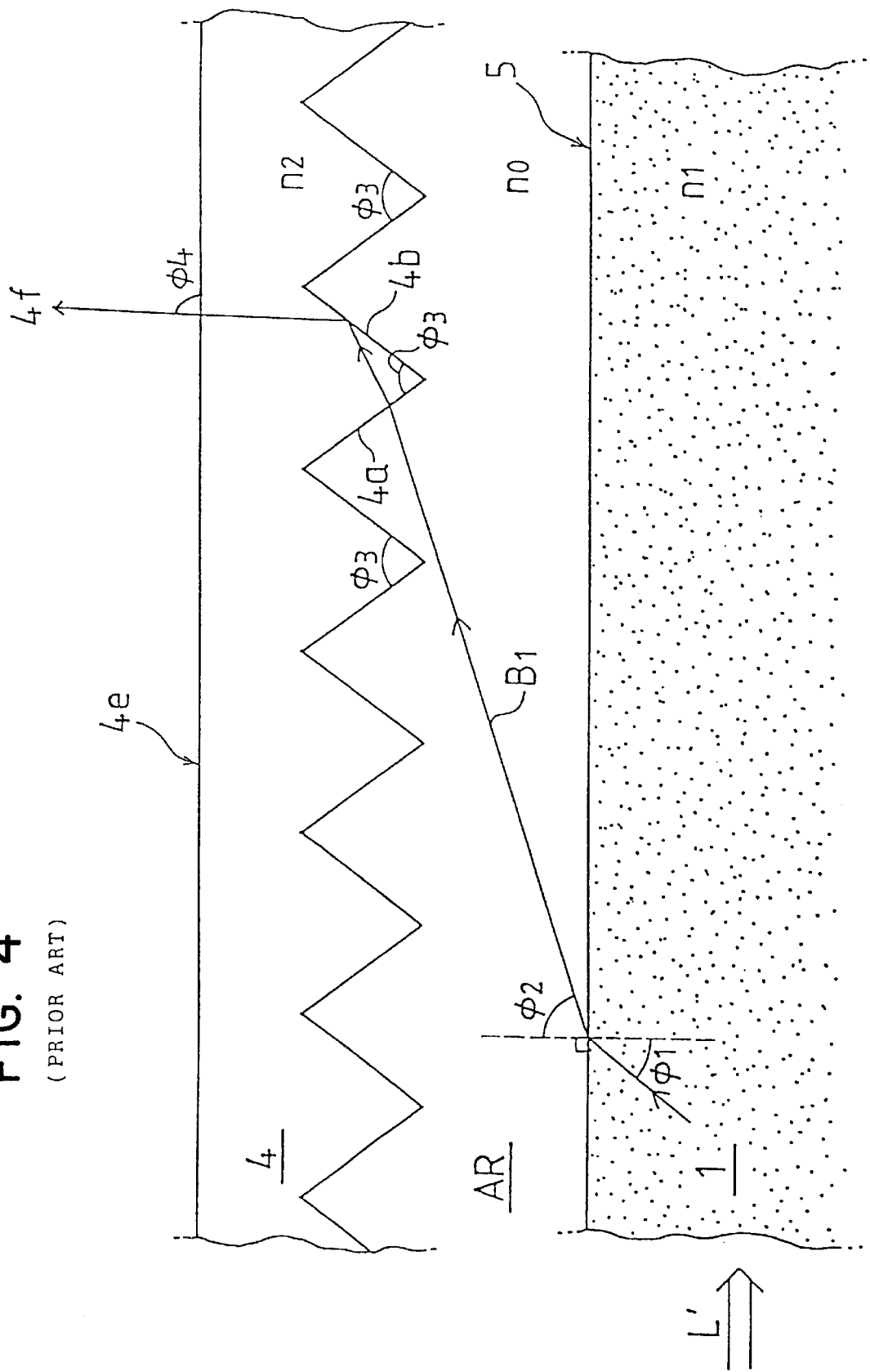
FIG. 4 is a view for explaining an action of a prism sheet arranged inwards.

The present invention will now be described in detail with reference to embodiments I to XII according to the present invention. In a description of each embodiment, reference numerals are appropriately used in common. A repetitive description of the same elements, structure or function will be omitted according to circumstances. In particular, it is to be noted that a light guide plate used in each embodiment may be identical with that cited in FIGS. 1, 2 and 3 or the like.

A light guide plate 1 with emitting directivity used in each embodiment has a matrix consisting of polymethyl methacrylate (PMMA having refractive index of 1.492), and fine particles having refractive index different from that of the matrix, i.e., particles of different refractive index are uniformly distributed in the matrix. A silicone resin material (Tospearl 120: registered trademark/manufactured by Toshiba silicone Co., Ltd.) is used as the fine particles.

The silicone resin material is contained at a rate of 0.03 wt. %, for instance. It is to be noted that the rate of content of the particles of different refractive index is determined in view of a design. In general, the rate of content is set to be lower, according as an emitting surface is increased in size (depth).

The light guide plate 1 is specifically sized as described above. For instance, the light guide plate 1 is 180 mm in depth as viewed from the side of an incidence surface 2, 135 mm in width, 2.5 mm in thickness on the side of the incidence surface 2 and 0.5 mm in thickness on the side of an end surface 7. A straight tube-like lamp L (a cold cathode tube having a tube diameter 1 of 2.4 mm) is disposed as a light supply means at a distance of 1.0 mm from the incidence surface 2 of the light guide plate 1.

The lamp L is partially surrounded from the rear with a reflection sheet R consisting of silver foil in order to prevent light from being scattered and lost. A silver foil sheet is disposed as another reflector 3 along a back surface of the light guide plate 1.

Embodiment I

Figure 9:
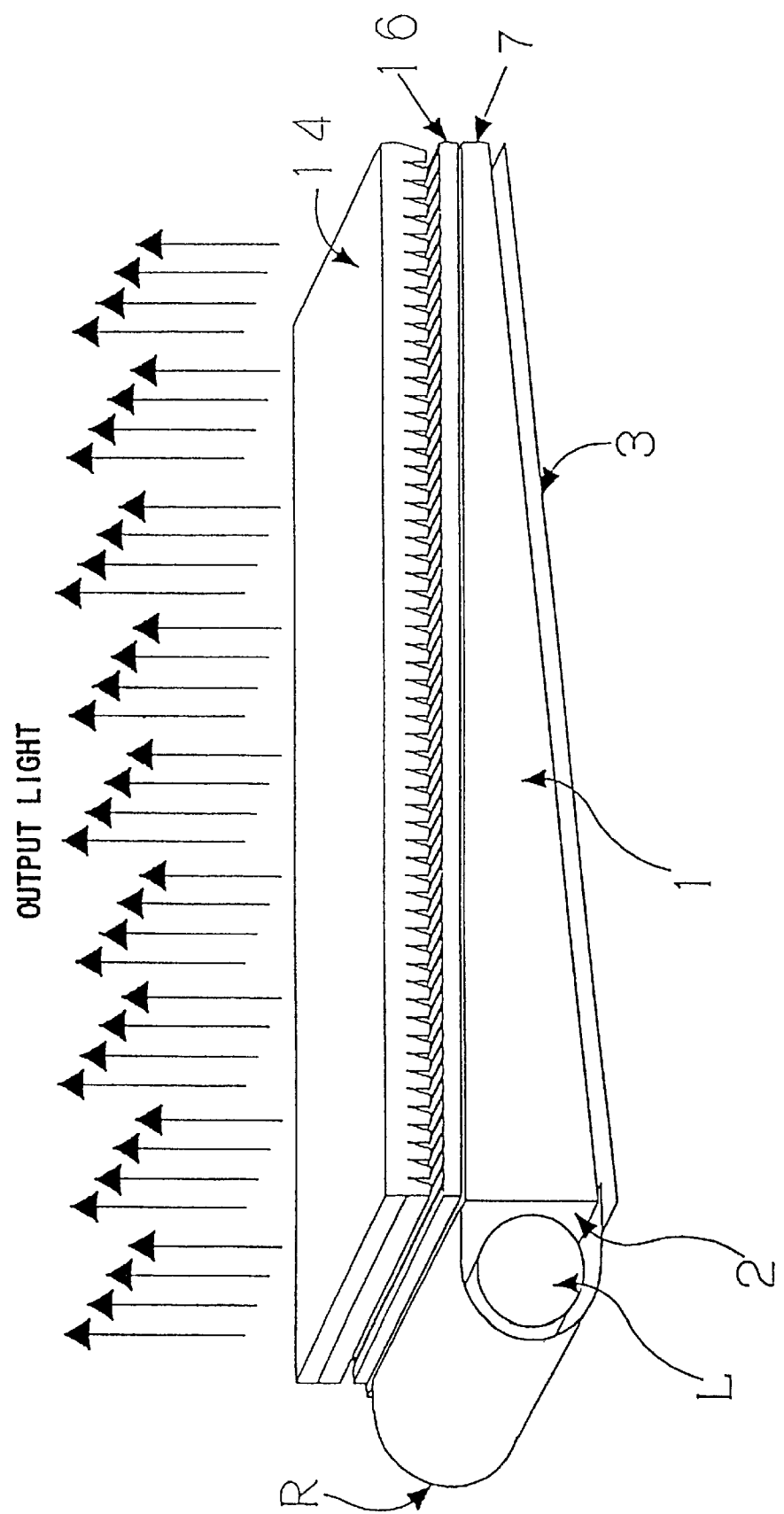
FIG. 9 is a sketch showing an overall arrangement of an embodiment I.

An overall arrangement is schematically shown in FIG. 9. In this embodiment, a propagation direction characteristics modifier 14 and a reflection pattern sheet 16 are disposed instead of the prism sheet 4 in the prior art shown in FIG. 3. The reflection pattern sheet 16 is disposed as a reflection pattern means on the inside of the propagation direction characteristics modifier 14.

Figure 10:
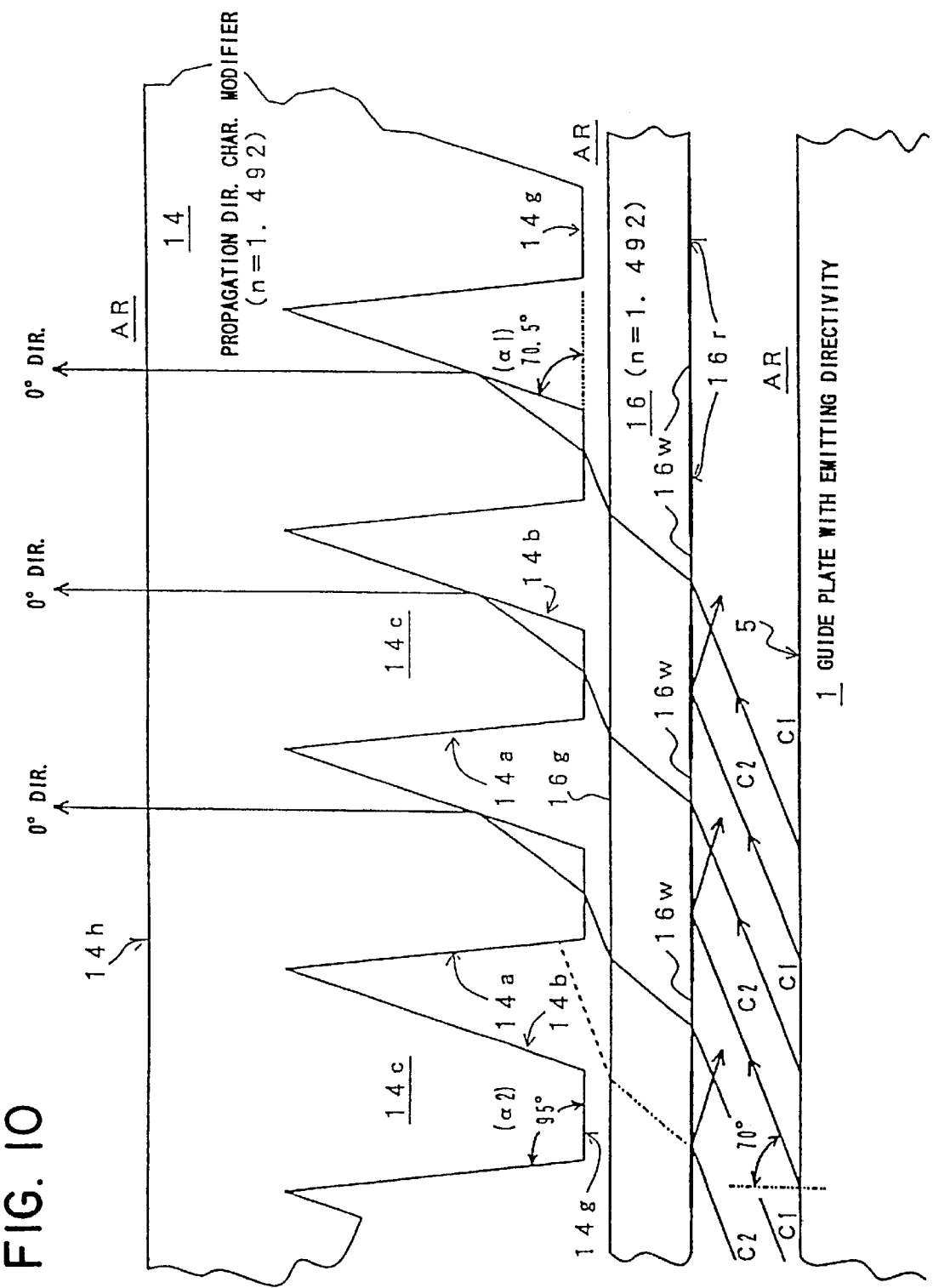
FIG. 10 is an enlarged-scale sectional view showing the vicinity of an emitting surface of a light guide plate, a propagation direction characteristics modifier and a reflection pattern sheet, together with propagation paths of typical beams in relation to embodiments I to III.

A description will be given of a structure and a function of the propagation direction characteristics modifier 14 and those of the reflection pattern sheet 16 with reference to FIG. 10. FIG. 10 is an enlarged-scale sectional view showing the vicinity of the emitting surface 5 of the light guide plate 1, the propagation direction characteristics modifier 14 and the reflection pattern sheet 16, together with propagation paths of typical beams.

Referring to FIGS. 9 and 10, the propagation direction characteristics modifier 14 is made of a transparent resin material (PMMA having refractive index of 1.492). The propagation direction characteristics modifier 14 includes a large number of ridges 14c as projection elements which form on-dimensional array. A distal end of each ridge 14c has a flat region 14g. each flat region 14g has a parallel relation to the emitting surface 5, and functions as an input surface which receives output light from the emitting surface 5. Between two side surfaces 14a, 14b of each ridge 14c, the side surface 14b distant from the incidence surface 2 functions as a total reflection surface which deflects light introduced into the propagation direction characteristics modifier 14 to a frontal direction in a section orthogonal to the lamp.

An inclination angle of the reflective deflection surface 14b is designed to be fit for such a function of deflection. Although an inclination angle of the other side surface 14a is arbitrarily determined in general, this inclination angle is preferably designed such that a distance between the flat regions 14g may be sized as small as possible.

The reflection pattern sheet 16 disposed inside the propagation direction characteristics modifier 14 is also made of a transparent resin material (PMMA having refractive index of 1.492), and reflection portions 16r are distributed in a stripe pattern on one surface (an inside surface in this embodiment). A portion between one reflection portion 16r and its adjacent reflection portion 16r is provided as a window portion 16w. The reflection portions 16r may preferably take the shape of a layer or film consisting of Ag or Al having regular reflecting properties.

A pattern of light and shade stripes observed on the outside surface of the reflection pattern sheet 16 in FIG. 9 represents light and shade portions formed by an action which will be described later. This stripe pattern is not equivalent to a pattern of stripes of the reflection portions 16r and the window portions 16w themselves. However, when the reflection portions 16r are formed on the outside surface of the reflection pattern sheet 16, it is to be noted that the stripes of light and shade portions shown in FIG. 9 represent light and shade portions defined by the reflection portions 16r.

A cycle of formation of the reflection portions 16r is designed to be equal with a cycle of formation of the projection elements 14c of the propagation direction characteristics modifier 14. A relatively positional relation between the size (stripe width) of each reflection portion 16r and each projection element (ridge) 14c is designed so as to block light from being incident on a V-shaped notch portion between the flat regions 14g without obstructing light incident on each flat region 14g.

A process of deflection of a flux to a frontal direction and convergence in this embodiment is as follows.

(1) A flux having clear directivity is outputted from the emitting surface 5 of the light guide plate 1 with emitting directivity. As described above, the preferential propagation direction of this flux is inclined at an angle of about 60 to 80° with respect to a normal extending from the emitting surface 5. In this case, an output flux is represented by beams C1, C2 outputted at an angle of 70° to the normal by taking the mean between the above inclination angles. However, this flux is diffused to some extend in a propagation direction (See FIG. 6).

(2) The output flux is led to the reflection pattern sheet 16, and is incident on the reflection portions 16r or the window portions 16w. Each window portion 16w is formed as a flat surface having no reflection portion 16r. Most of the flux (represented by C1) incident on the window portions 16w is refracted according to Snel's rule of refraction, and makes a propagation into the reflection pattern sheet 16.

On the other hand, a flux (represented by C2) incident on the reflection portions 16r is reflected toward the emitting surface 5. The reflected light or a small quantity of light reflected from the window portions 16w is given an opportunity of incidence on the reflection pattern sheet 16 again through a process including reflection by the emitting surface 5, incidence on the light guide plate 1 again, output from the emitting surface 5 again and so on. In this manner, the reflected light is utilized through a recycling process.

(3) The flux having intruded into the reflection pattern sheet 16 directly or through the recycling process is outputted from the flat outside surface 16g to the air layer AR again. In this case, refraction occurs according to Snel's rule. However, since a phenomenon occurring in 16w and that occurring in 16g are canceled with each other, it may be considered that a direction of the flux (C1) and its diffusion do not vary before and after the transmission of flux through the reflection pattern sheet 16.

As described above, the light and shade portions corresponding to the stripe pattern of the reflection portions 16r are formed on the outside surface 16g of the reflection pattern sheet 16.

(4) The flux (represented by C1) transmitted through the reflection pattern sheet 16 is obliquely incident on the flat regions 14g of the propagation direction characteristics modifier 14. In other words, a structure and an arrangement of the propagation direction characteristics modifier 14 and those of the reflection pattern sheet 15 are designed such that a path of the flux transmitted through the reflection pattern sheet 18 and a position and a size of each flat region 14g are matched with each other.

Figure 6:
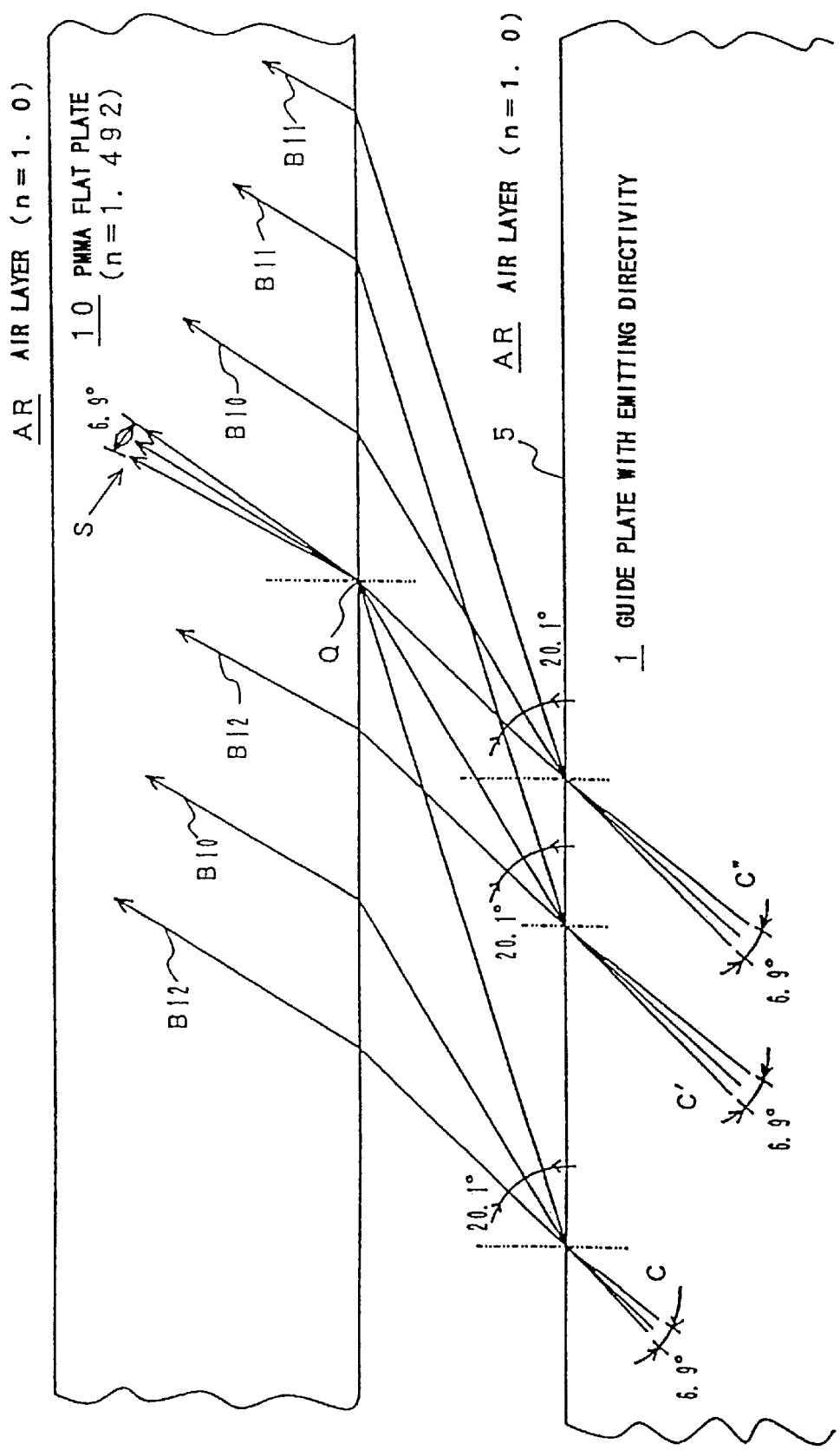
FIG. 6 is a view for explaining a general converging action caused by light obliquely incident on a flat surface.
Figure 7:
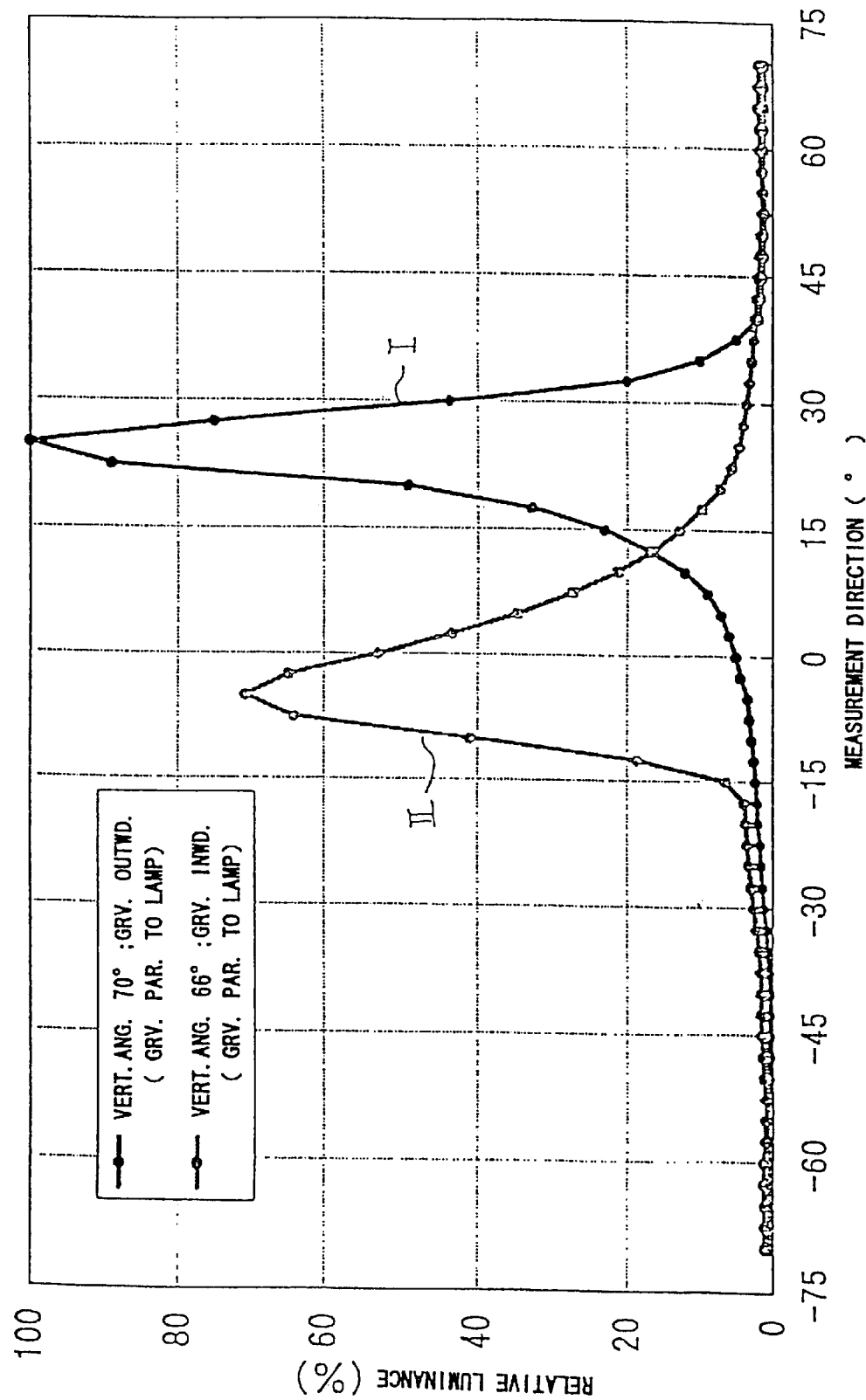
FIG. 7 is a graph showing angle characteristics of output light intensity plotted under the conditions of measurement similar to those in FIG. 1 with respect to an arrangement "with grooves inwards" and an arrangement "with grooves outwards"
Figure 8:
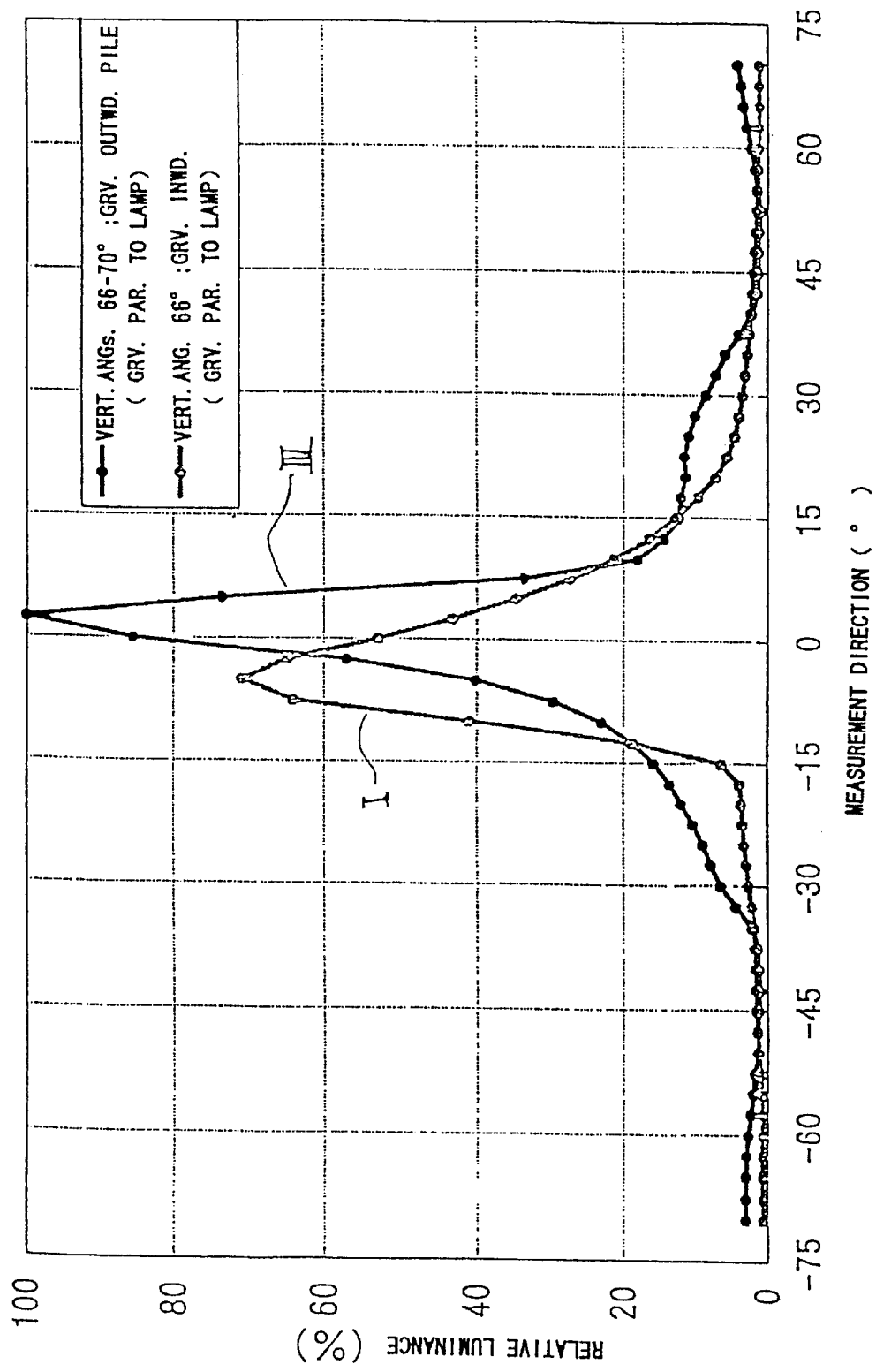
FIG. 8 is a graph showing a comparison for explaining an action when two prism sheets are layered in an arrangement "with grooves outwards"

When the light is obliquely incident on the flat regions 14g, a degree of parallelization of the flux in the propagation direction is improved by the converging action which has been described with reference to FIG. 6. The light is blocked by the reflection pattern sheet 16 from being incident on the notch portions (uneffective areas) between the flat regions 14g.

(5) The flux (represented by C1) obliquely incident on the flat regions 14g of the propagation direction characteristics modifier 14 is totally reflected by the total reflective deflection side surfaces 14b of the projection elements 14c. In the total reflection, it is a matter of course that the degree of parallelization of the flux improved by the incidence on the flat regions 14g is not degraded.

An inclination angle of each total reflective deflection side surface 14b is designed such that a flux is deflected to around a frontal direction due to the total reflection. In this case, an inclination angle $\alpha 1$ of 70.5° is given on the assumption that this inclination angle is calculated as an optimum angle on condition that the typical beam C1 (at an output angle of 70° from the emitting surface 5) is taken as an instance, and the propagation direction characteristics modifier 14 and the reflection pattern sheet 16 respectively have refractive index of 1.492.

The optimum inclination angle of each reflective deflection surface 14b varies to some extent according to conditions of the output angle (substantially depending on the refractive index of the light guide plate 1) of the beam from the emitting surface 5, and the refractive index of the propagation direction characteristics modifier 14 and that of the reflection pattern sheet 16. The materials practically used for the light guide plate 1, the propagation direction characteristics modifier 14 and the reflection pattern sheet 16 have refractive index in the range of about 1.49 to 1.6. $\alpha 1$ is practically in the range of $67° \leq \alpha 1 \leq 75°$ when calculated in view of the above refractive index.

Although an inclination angle $\alpha 2$ of the other surface 14a has no absolute limitation, it is not preferable from points of view in technique of manufacture and mechanical strength that $\alpha 2$ is largely lower than $\alpha 1$. In this case, it may be that light reflected by the reflective deflection surfaces 14b will be reflected again.

On the other hand, when $\alpha 2$ largely exceeds 90°, a problem arises in reduction of the rate of occupation of the flat regions 14g. In consideration of these facts, $\alpha 2$ is practically in the range of $64° \leq \alpha 2 \leq 115°$. It is preferable in the range of $90° \leq \alpha 2 \leq 110°$. In particular, an inclination angle $\alpha 2$ of about 90° is advantageous in facilitating a manufacture process and in providing a high rate of occupation of the flat regions 14g.

(6) The flux deflected to around the frontal direction due to the total reflection by each reflective deflection surface 14b is incident on the flat outside surface 14h of the propagation direction characteristics modifier 14 at substantially right angles therewith, and is radiated as an illumination flux to the outside air layer AR. This process corresponds to a propagation of a flux from a high reflective index medium to a low refractive index medium. However, since the flux is incident on the outside surface 14h at substantially right angles therewith, diffusion of the flux (degradation of the degree of parallelization) hardly occurs. Consequently, the deflection of the flux is achieved together with the improvement in the degree of parallelization due to transmission of the flux through the flat propagation direction characteristics modifier 16.

According to a modification of this embodiment I, the reflection portions 16r may be formed on the outside surface of the reflection pattern sheet 16. An action in this case is substantially similar to that in the above-described embodiment I, except that reflection occurs on the outside surface of the reflection pattern sheet 16, instead of the inside surface thereof.

Embodiment II

Figure 11:
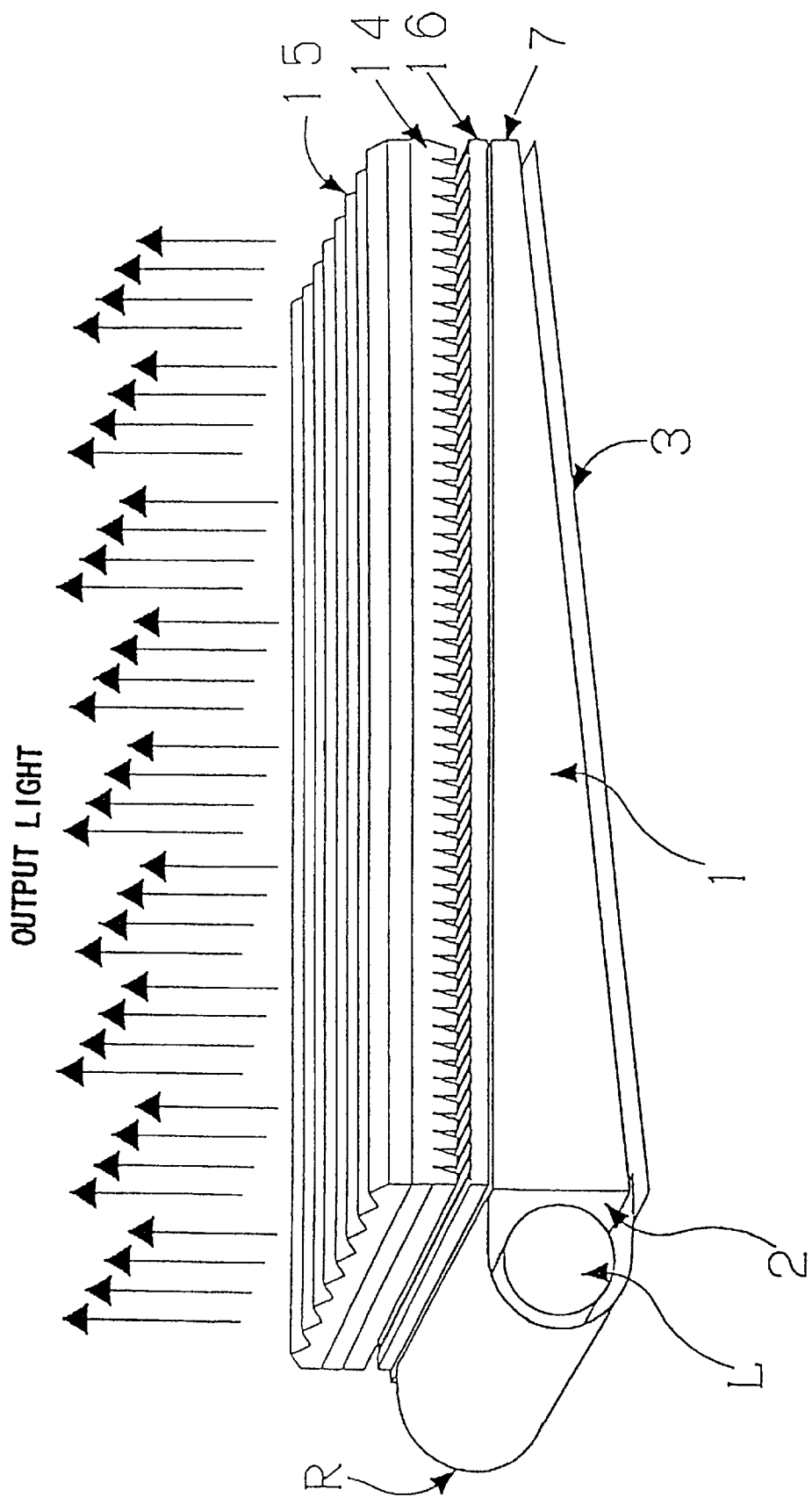
FIG. 11 is a sketch showing an overall arrangement of the embodiment II.

Referring to FIG. 11, a structure similar to that of the embodiment I is applied to this embodiment. However, a prismatic groove array 15 lined up in a direction orthogonal to the lamp is formed on an outside surface of a propagation direction characteristics modifier 14. A detailed description of a structure and a function common to those in the embodiment I will be omitted.

According to this embodiment, frontal directivity is improved in a section parallel to the lamp, since the prismatic groove array 15 lined up in the direction orthogonal to the lamp is formed on the outside surface of the propagation direction characteristics modifier 14.

Such a technical means is effective, since output light from an emitting surface of a light guide plate 1 with emitting directivity shows gentle directivity to a frontal direction in a section parallel to the lamp, and there is room for improvement in directivity.

Figure 1:
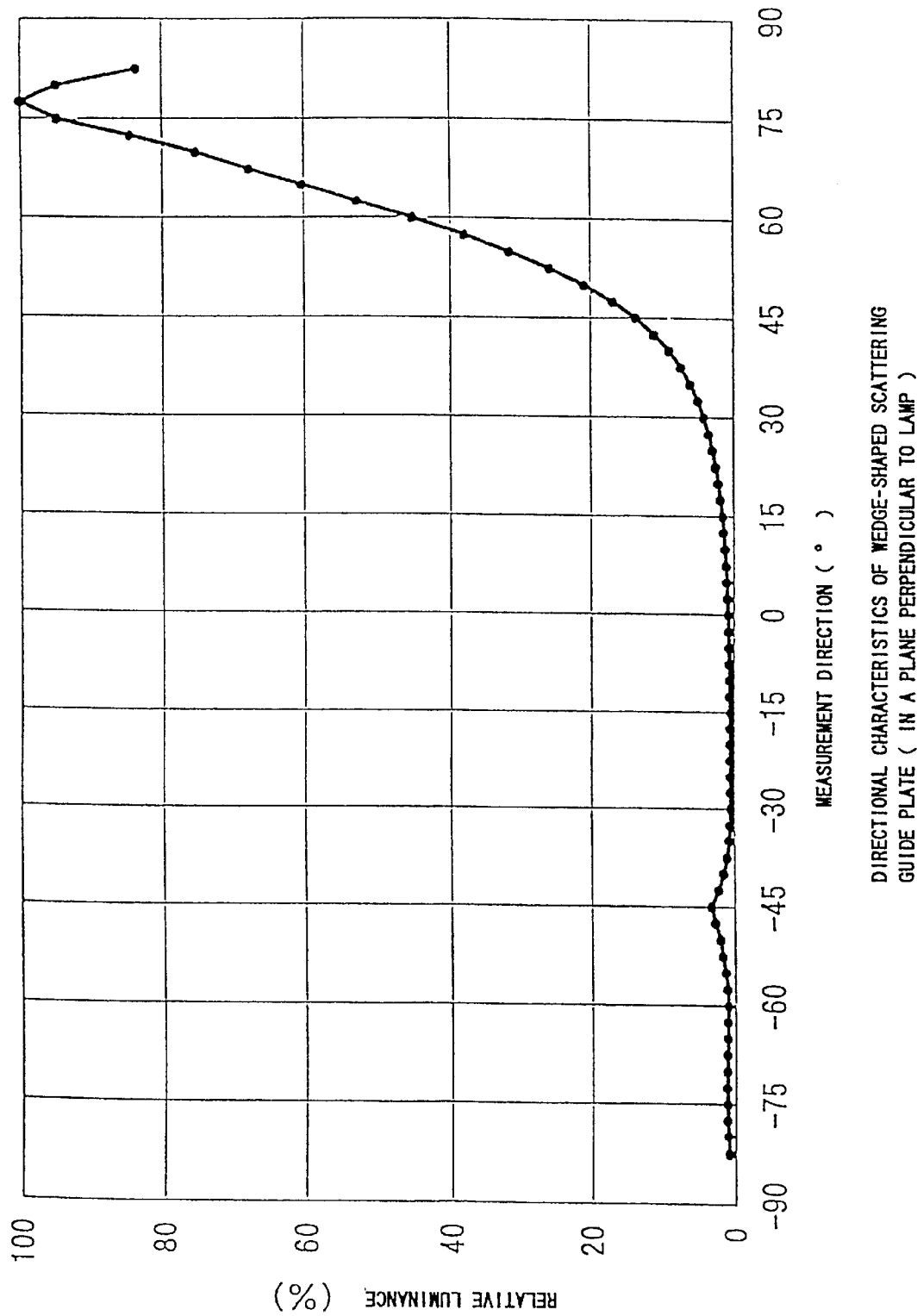
FIG. 1 is a graph showing angle characteristics (in a section orthogonal to a lamp) of output light intensity when a light guide plate with emitting directivity is used in a surface light source device of side-light type.
Figure 12:
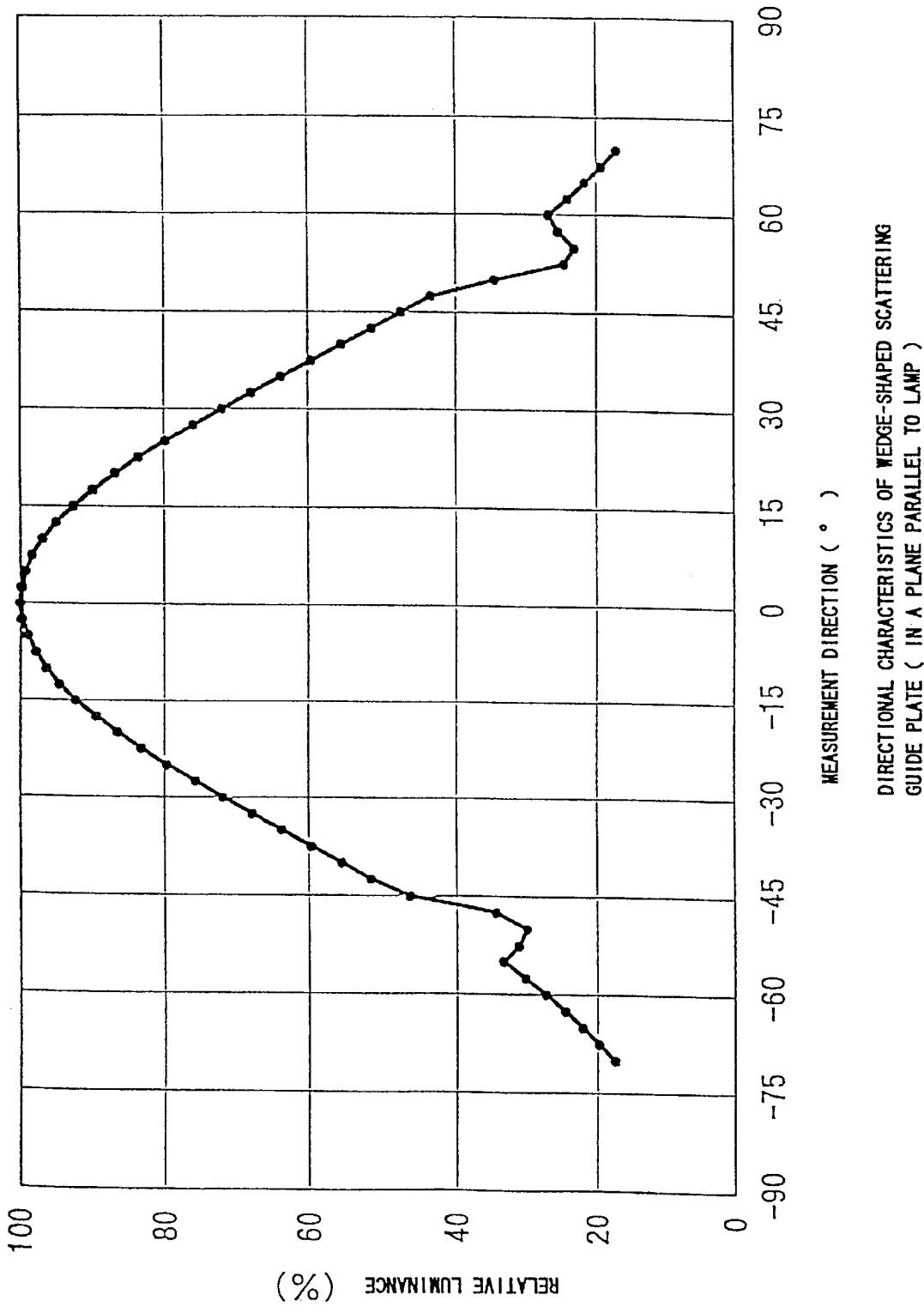
FIG. 12 is a graph sowing angle characteristics (in a section parallel to a lamp) of output light intensity when alight guide plate with emitting directivity is used in a surface light source device of side-light type.

FIG. 12 is a graph similar to that in FIG. 1 and illustrating the above fact. A substance (a surface light source device of side-light type) to be measured to provide this graph is identical with that to provide the graph in FIG. 1. However, a section for scanning by turning a line of sight of a luminance meter is perpendicular to the substance to be measured shown in FIG. 2. That is, the luminance meter is scanned by turning in a section which is parallel to the lamp and passes through a central point P (See FIG. 2) of the emitting surface on condition that the line of sight of the luminance meter always passes through the central point P. A measured luminance value is plotted on the ordinate after having been calculated in terms of a relative luminance value (%) to a peak value.

As read from the graph in FIG. 1, it may be considered that a considerable quantity of light is outputted even in a direction largely deviated from a frontal direction (0°).

Figure 5:
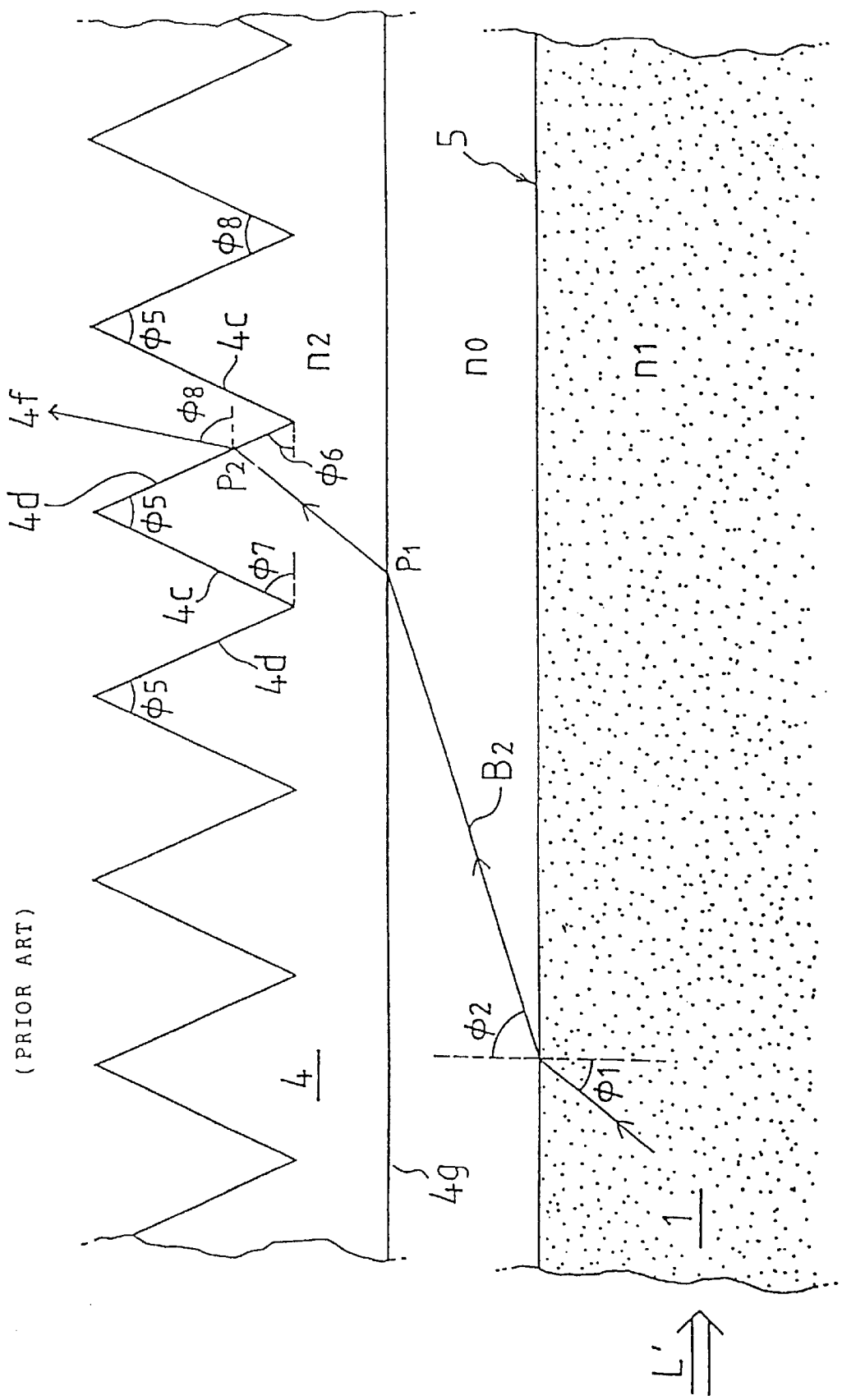
FIG. 5 is a view for explaining an action of a prism sheet arranged outwards.

An optical action of the prismatic groove array 15 formed on the outside surface of the propagation direction characteristics modifier 14 is basically equal to that of the prism surfaces 4c, 4d of the prism sheet 4 which has been described in FIG. 5. However, the prismatic groove array 15 effectively fulfills an action of deflection and convergence in a direction perpendicular to a direction (a direction orthogonal to the lamp) of the prismatic groove array 15, that is, in a section parallel to the lamp.

Accordingly, brightness of the surface light source device as viewed from a frontal direction is further improved by forming such a prismatic groove array 15 on the outside surface of the propagation direction characteristics modifier 14. An apex angle of each prism element forming the prismatic groove array 15 may be preferably sized to be in the range of about 90 to 110°, particularly about 100°.

Embodiment III

Figure 13:
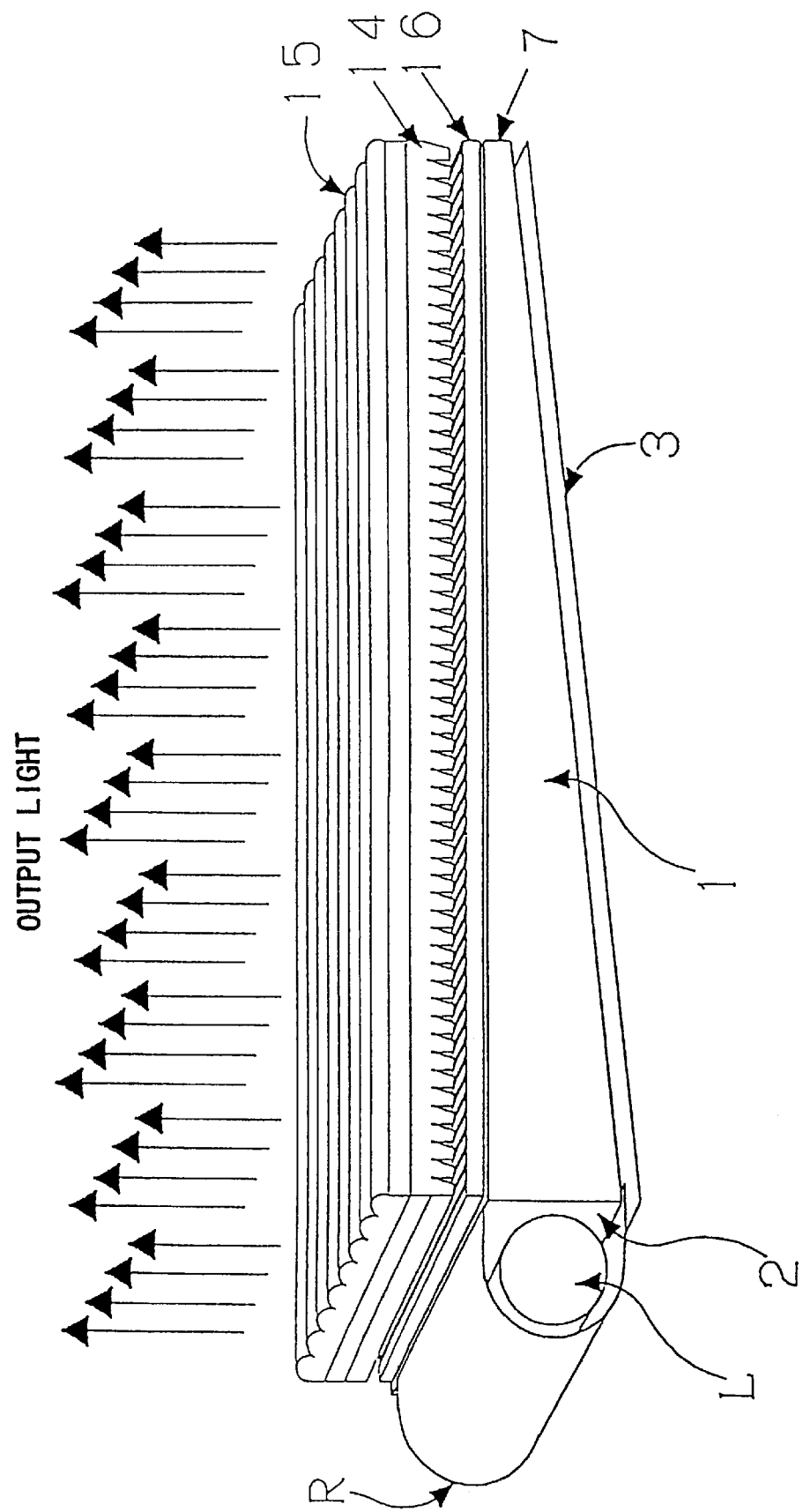
FIG. 13 is a sketch showing an overall arrangement of the embodiment III.

Referring to FIG. 13, a cylindrical lens array, instead of the prismatic groove array, is formed on an outside surface of a propagation direction characteristics modifier 14. As a matter of course, the cylindrical lens array 15 is oriented in a direction orthogonal to the lamp. It is not too much to say that such a cylindrical lens array 15 fulfills an action of deflection and convergence similar to that of the prismatic groove array in the embodiment II, and improves brightness of a surface light source device as viewed from a frontal direction.

Embodiment IV

Figure 14:
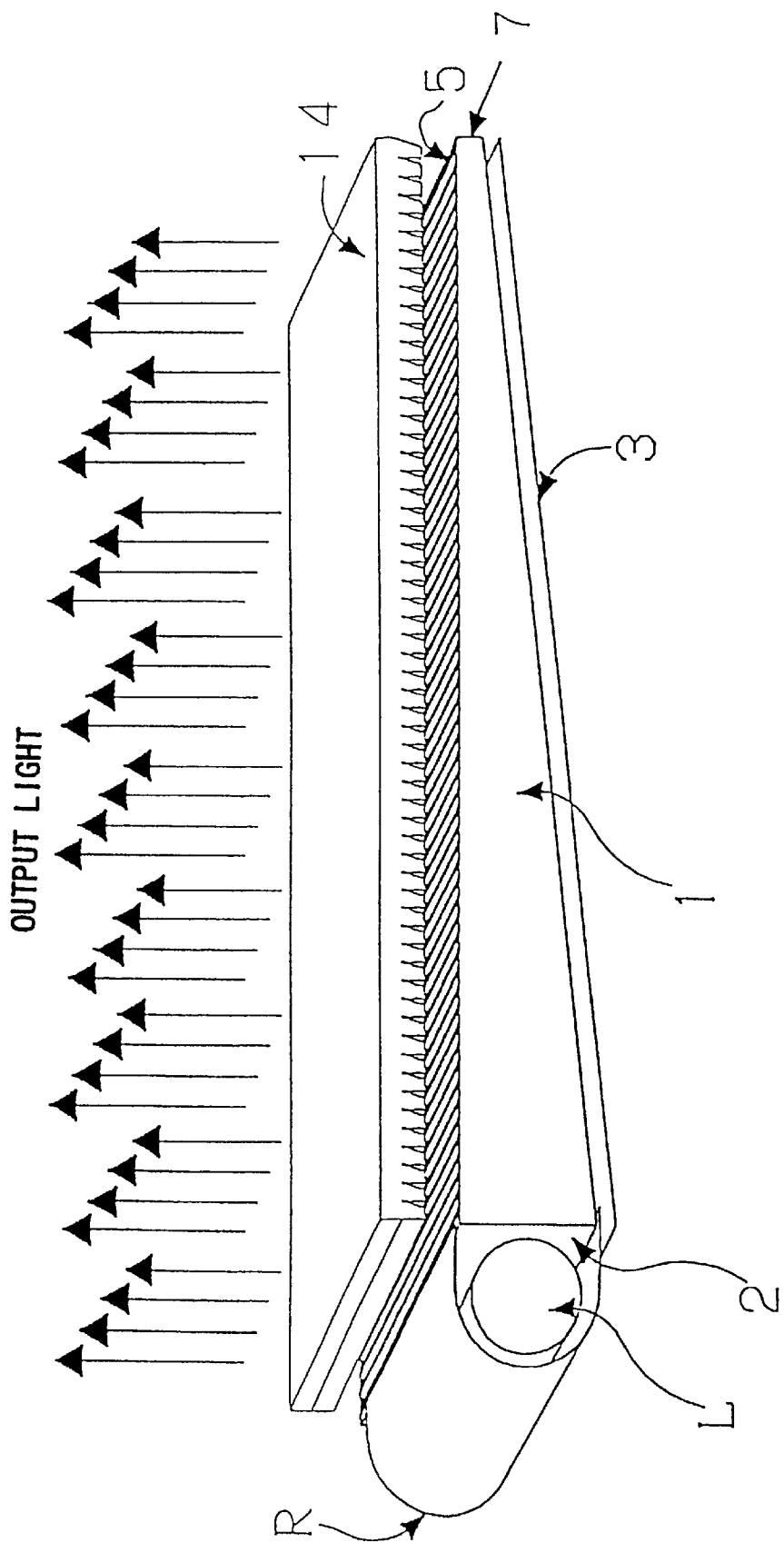
FIG. 14 is a sketch showing an overall arrangement of an embodiment IV.

Referring to FIG. 14, the reflection pattern sheet 16 in the embodiment I is replaced with a reflection pattern formed on an emitting surface 5 of a light guide plate 1.

Figure 15:
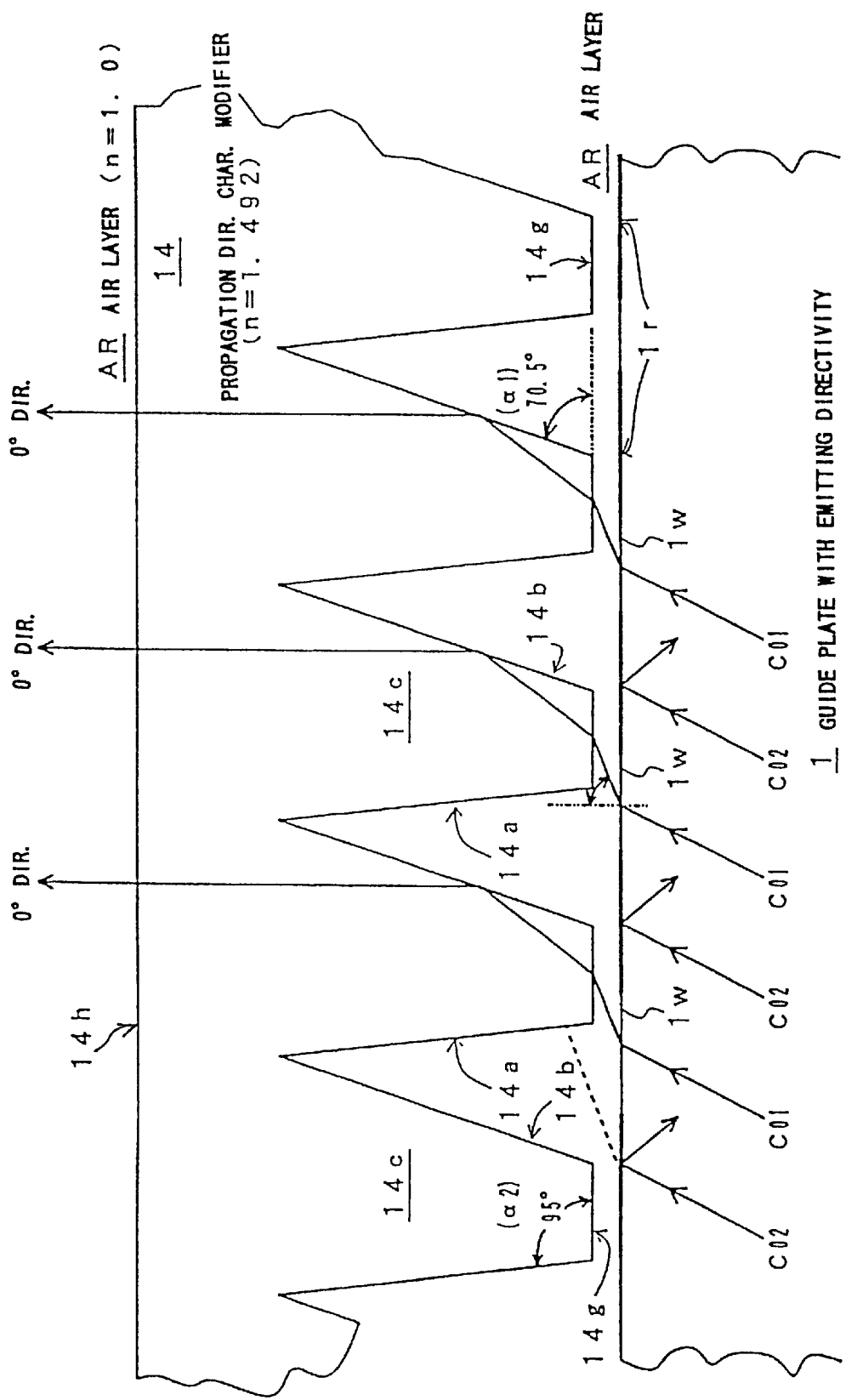
FIG. 15 is an enlarged-scale sectional view showing the vicinity of an emitting surface of a light guide plate, a propagation direction characteristics modifier, and a reflection pattern sheet, together with propagation paths of typical beams in relation to embodiments IV to VI.

A structure and a function of the reflection pattern formed on the light guide plate 1 will be described with reference to FIG. 15. FIG. 15 is an enlarged-scale sectional view showing the vicinity of the emitting surface 5 of the light guide plate 1 and a propagation direction characteristics modifier 14 in the form similar to that shown in FIG. 10, together with propagation paths of typical beams.

Referring to FIGS. 14 and 15, the propagation direction characteristics modifier 14 is basically similar to that shown in FIG. 10. Therefore, a repetitive detailed description of its structure and function will be omitted.

The reflection pattern formed on the emitting surface 5 of the light guide plate 1 includes a large number of reflection portions 1r. These reflections portions 1r are distributed so as to form the stripe pattern as shown in FIG. 14. The reflection portions 1r may preferably take the shade of a layer or film consisting of Ag or Al having regular reflecting properties. A cycle of formation of the reflection portions 1r is designed to be equal with a cycle of formation of the projection elements 14c of the propagation direction characteristics modifier 14.

A relatively positional relation between the size (stripe width) of each reflection portion 1r and each projection element (ridge) 14c is designed to block light from being incident on a V-shaped notch portion between the flat regions 14g without obstructing light incident on each flat region 14g. Such reflection portions 1r fulfill a function similar to that of the reflection portions 16r of the reflection pattern sheet 16 used in the embodiments I to III.

A process of deflection of a flux to a frontal direction and convergence in this embodiment is as follows.

(1) A flux having clear directivity is outputted from window portions 1w, that is, portions having no reflection portions 1r, of the emitting surface 5 of the light guide plate 1 with emitting directivity. The preferential propagation direction of such a flux is inclined at an angle of about 60 to 80° with respect to a normal extending from the emitting surface 5. In this case, an output flux is represented by a beam C01 outputted at an angle of 70° with respect to the normal described above by taking the mean between the above inclination angles. However, this flux is diffused to some extent in a propagation direction (see FIG. 6).

On the other hand, a flux (represented by C02) incident on the reflection portions 1r within the light guide plate 1 is returned to the light guide plate 1. This reflected light is given an opportunity of output of light from the window portions 1W again through a process including scattering inside the light guide plate 1 and reflection by the back surface. In this manner, light reflected by the reflection portions 1r is utilized through a recycling process.

(2) The flux (represented by C01) having escaped from the window portions 1w into the air layer AR directly or through the above recycling process is obliquely incident on the flat regions 14g of the propagation direction characteristics modifier 14. In other words, an arrangement of the propagation direction characteristics modifier 14 and that of the reflection portions 1r are designed such that a path of the flux having escaped from the window portions 1w and a position and a size of the flat regions 14g are matched with each other.

When the light is obliquely incident on the flat regions 14g, a degree of parallelization of a flux in a propagation direction is improved by the converging action which has been described with reference to FIG. 6. It is to be noted that light is blocked by the reflection portions 1r from being incident on notch portions (uneffective area) between the flat regions 14g.

(3) The flux (represented by C01) obliquely incident on the flat regions 14g of the propagation direction characteristics modifier 14 is totally reflected by one reflective deflection surface 14b of each projection element 14c. There is no possibility that the degree of parallelization of the flux improved by the light incident on the flat regions 14g is degraded due to such total reflection. As described in the embodiment I, an inclination angle of each reflective deflection surface 14b is designed such that a flux is deflected to around a frontal direction due to the total reflection.

In this case, an inclination angle $\alpha 1$ of 70.5° is given as an optimum angle calculated on condition that the typical beam C01 (at an output angle of 70° from the emitting surface 5) is taken as an instance and the propagation direction characteristics modifier 14 has refractive index of 1.492.

The optimum inclination angle of the reflective deflection surface 14b varies to some extent according to the conditions of the output angle (substantially depending on the refractive index of the light guide plate 1) from the emitting surface 5 and the refractive index of the propagation direction characteristics modifier 14. As described above, the materials practically used for the light guide plate 1 and the propagation direction characteristics modifier 14 have refractive index in the range of about 1.49 to 1.6. α1 is practically in the range of 65°≦α1≦75° when calculated on assumption of the above fact.

An inclination angle α2 of the other surface 14a has no absolute limitation. As described above, α2 is practically in the range of 65°≦α2≦115°, preferably 90°≦α2≦110°. Further, similarly to the case in the embodiments I to III, an inclination angle α2 of about 90° is effective in facilitating a manufacture process and in providing a high rate of occupation of the flat regions 14g.

(4) The flux deflected to around the frontal direction due to the total reflection of the reflective deflection surfaces 14b is incident on the flat outside surface 14h of the propagation direction characteristics modifier 14 at substantially right angle therewith, and is radiated as an illumination flux to the outside air layer AR. This process corresponds to a propagation of a flux from a high refractive index medium to a low refractive index medium.

Since the light is incident on the outside surface 14h at substantially right angles therewith, diffusion of the flux (degradation of the degree of parallelization) hardly occurs. Consequently, the deflection of the flux is achieved together with the improvement in the degree of parallelization due to transmission of light through the flat propagation direction characteristics modifier 14.

Embodiment V

Figure 16:
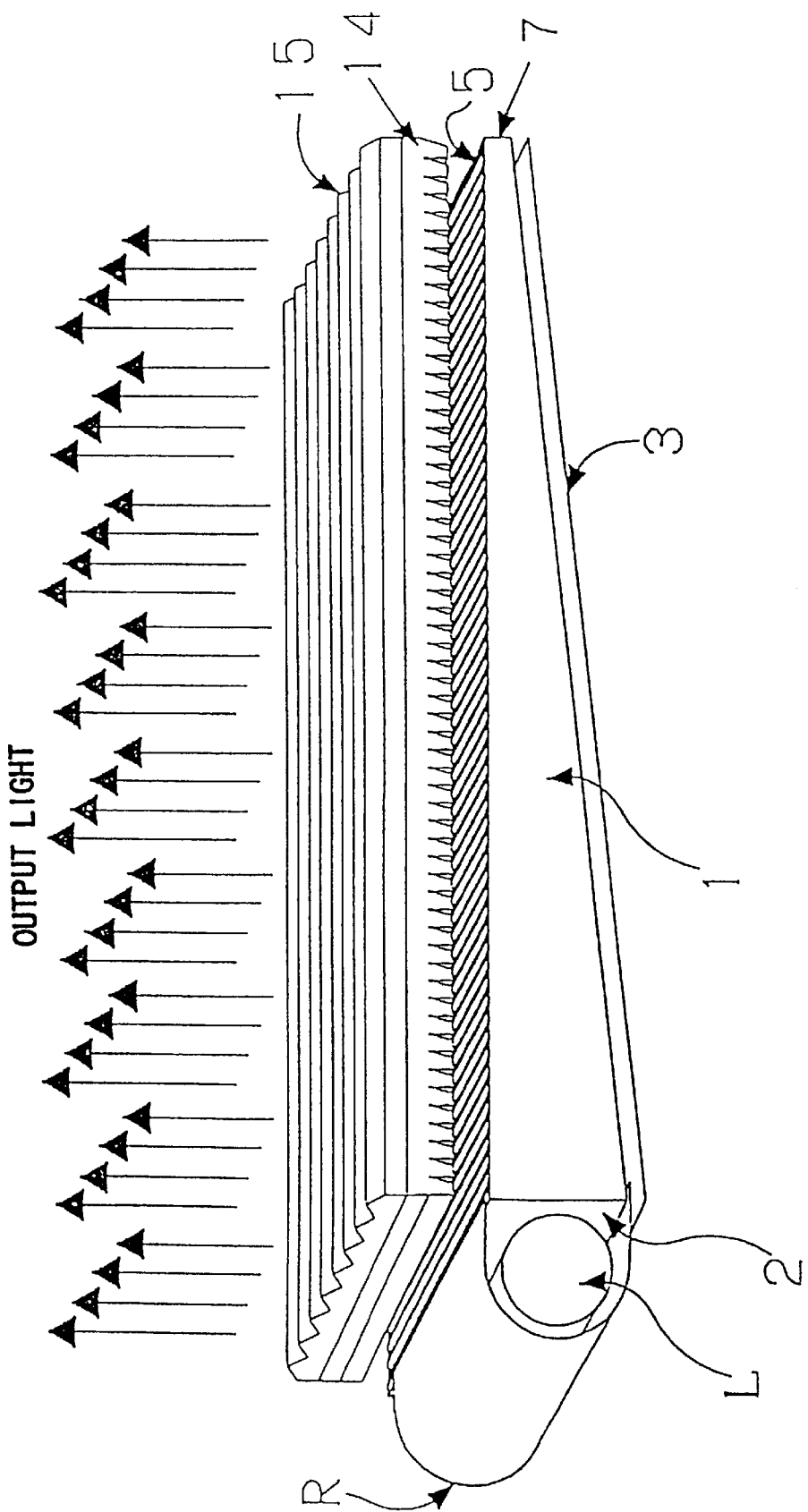
FIG. 16 is a sketch showing an overall arrangement of the embodiment V.

Referring to FIG. 16, a structure basically similar to that in the embodiment IV is applied to this embodiment. However, a prismatic groove array 15 lined up in a direction orthogonal to the lamp is formed on the outside surface of the propagation direction characteristics modifier 14. It is not too much to say that an action of the prismatic groove array 15 formed on the outside surface of the propagation direction characteristics modifier 14 is similar to that described in the embodiment II.

Brightness of a surface light source device as viewed from a frontal direction is further improved by forming the prismatic groove array 15 on the outside surface of the propagation direction characteristics modifier 14. An apex angle of each prism element forming the prismatic groove array 15 is preferably sized to be in the range of about 90 to 110°, particularly about 100°, similarly to the case of the embodiment II.

Embodiment VI

Figure 17:
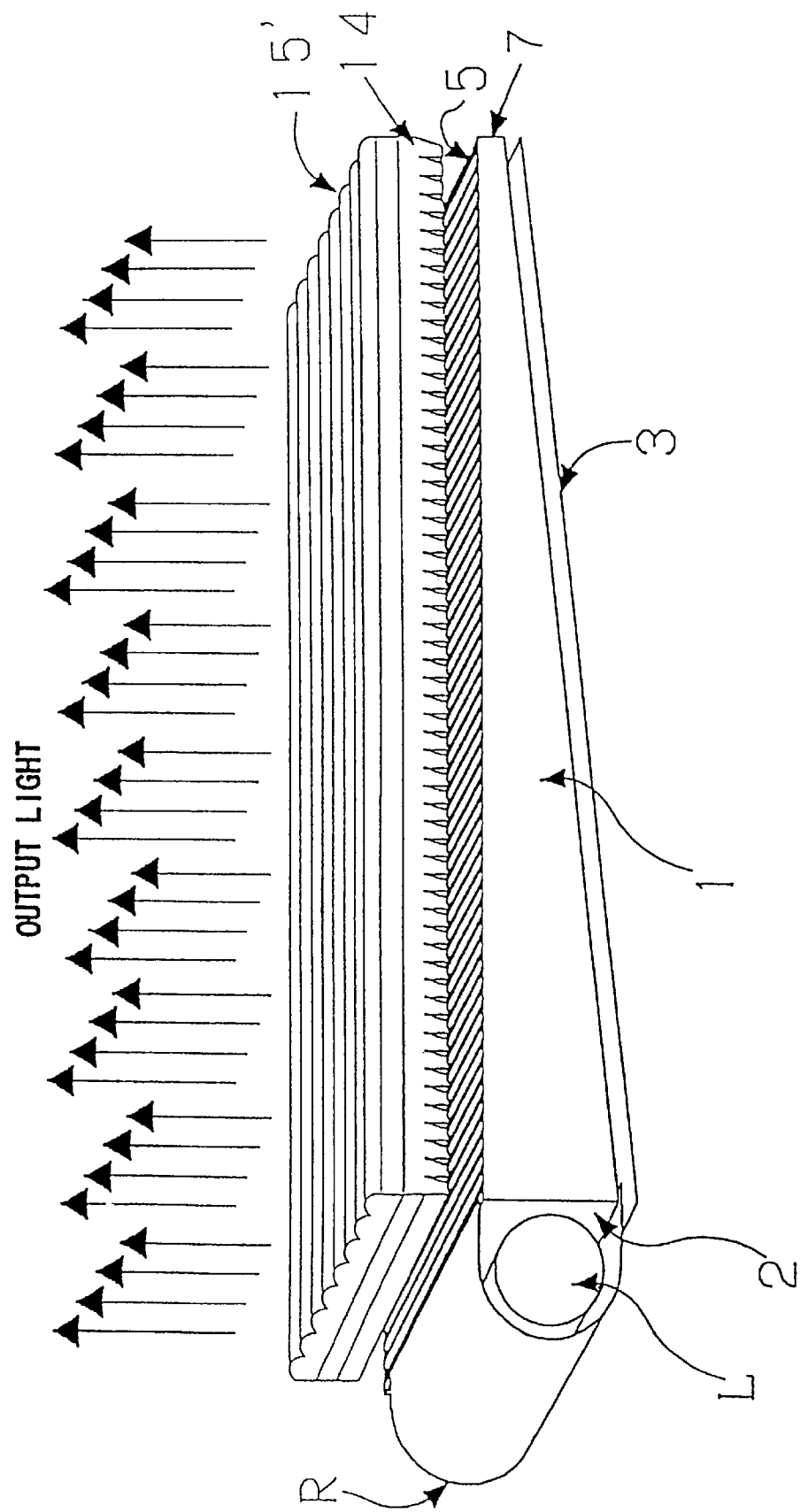
FIG. 17 is a sketch showing an overall arrangement of the embodiment VI.

Referring to FIG. 17, a cylindrical lens array, instead of the prismatic groove array, is formed on the outside surface of the propagation direction characteristics modifier in the embodiment V. The cylindrical lens array 15 is oriented in a direction orthogonal to the lamp. It is not too much to say that such a cylindrical lens array 15 fulfills an action of deflection and convergence similar to that in the embodiment III and improves brightness of a surface light source device as viewed from a frontal direction.

The above embodiments I to IV include the propagation direction characteristics modifier formed by one-dimensionally arraying a large number of projection elements. On the other hand, embodiments VII to XII which will be described later include a propagation direction characteristics modifier formed by two-dimensionally arraying a large number of projection elements.

A two dimensional array of projection elements such as pole-shaped projection elements each having a distal end provided with a flat region may be formed in order to two-dimensionally array a large number of projection elements.

An object to form a two-dimensional array of projection elements is to carry out a deflection to a frontal direction and a convergence not only in a section orthogonal to the lamp but also in a section parallel to the lamp and to further two-dimensionally improve the degree of parallelization of an illumination flux.

That is, the two-dimensional array of projection elements is designed to prevent an illumination flux from being diffused in a lateral direction as viewed from the lamp side for radiation, similarly to the prismatic groove or cylindrical lens used in the embodiments II, III, V and VI.

Accordingly, a function of preventing an illumination flux from being diffused in a lateral direction may be multiply enhanced by using the two-dimensional array of projection elements and the prism groove or the cylindrical lens in combination. Embodiments VII, VIII, X and XI show a specific structure including the two-dimensional array of projection elements and the prism groove or the cylindrical lens in combination.

Embodiment VII

This embodiment is equivalent to a structure in which the propagation direction characteristics modifier and the reflection pattern sheet in the embodiment I are modified from one-dimensional type to two-dimensional type. That is, as shown an overall arrangement in FIG. 18A together with an encircled portion on an enlarged scale in FIG. 18B, a propagation direction characteristics modifier 14 and a reflection pattern sheet 16 are disposed along a light guide plate with emitting directivity. This arrangement is similar to that in the embodiments I to III. Further, materials used for the propagation direction characteristics modifier 14 and the reflection pattern sheet 16 may be similar to those in the embodiments I to III.

However, the propagation direction characteristics modifier 14 and the reflection pattern sheet 16 are partially different in structure and function from those in the embodiments I to III. A description will now be given of this difference. The propagation direction characteristics modifier 14 made of a transparent resin material such as PMMA, for instance, includes a large number of square-pole-shaped projections 14c as projection elements forming a two-dimensional array.

A distal end of each square-pole-shaped projection 14c has a flat region 14a. Each flat region 14g has a parallel reflection to an emitting surface 5 and functions as an input surface which receives output light from the emitting surface 5, similarly to the case of one-dimensional array.

Among four side surfaces of each square-pole-shaped projection 14c, one side surface 14b distant from an incidence surface 2 functions as a total reflection surface which deflects light introduced in the propagation direction characteristics modifier 14 to a frontal direction in a section orthogonal to the lamp. That is, it fulfills a function similar to that of the reflective deflection surface 14b of the propagation direction characteristics modifier in one-dimensional array (embodiments I to IV).

Accordingly, an issue on size of an inclination angle of the reflective deflection surface in the description related to the embodiment I is also applied to this embodiment. That is, an inclination angle of the reflective deflection surface 14b is sized to be in the range of about 67 to 75° under practical conditions.

An inclination angle of the side surface 14a opposed to the reflective deflection surface 14b is sized to be generally in the range of 65 to 115°, preferably in the range of 90 to 110°, particularly about 90°, for the reasons similar to those in the case of the embodiment I.

Other two side surfaces 14e, 14f function as reflection surfaces which deflect light introduced in the propagation direction characteristics modifier 14 to a frontal direction in a section parallel to the lamp. That is, the sides surfaces 14e, 14f are different from the side surface 14b in effective direction of a function (perpendicular direction), but fulfills a function similar to that of the reflective deflection surface 14b. However, since a flux in a propagation direction is considerably diffused in a section parallel to the lamp, the side surfaces 14e, 14f cause considerable reflection which is not so much total reflection as the case of the reflective deflection surface 14b (See the graphs of FIGS. 1 and 10).

However, since there is no essential difference between the reflective reflection surfaces in function of reflective deflection itself, an inclination angle of the reflective deflection surface 14a may be sized on the basis of an inclination angle of the reflective deflection surface 14b. Accordingly, the inclination angle of the reflective deflection surface 14a may be sized to be in the range of 67 to 75°. Inclination angles of three reflecting deflection surfaces 14b, 14e, 14f may be designed to be equal with one another within the above range.

The reflection pattern sheet 16 is made of a transparent resin material such as PMMA, for instance, and is disposed on the inside of the propagation direction characteristics modifier 14. Reflection portions 16r are formed in a distributed state on one surface (an outside surface in this embodiment) according to a grid pattern. The reflection portions 16r may preferably take the shape of a layer or film consisting of Ag or Al having regular reflecting properties. A surface region having no reflection portion 16r is provided as a window portion 1w.

When the reflection portions 16r are formed on the inside surface of the reflection pattern sheet 16, it is to be noted that a pattern of light and shade portions shown in FIGS. 18A and 18B is not a pattern of the reflection portions and the window portions themselves and represents a pattern of light and shade portions appeared on the outside surface of the reflection pattern sheet 16.

The reflection pattern sheet 16 is provided to block output light from the emitting surface 5 of the light guide plate 1 from being incident on a notch portion (uneffective area) other than the flat region 14g of each projection element. Accordingly, a cycle of formation of the window portions 16w is designed to be equal with a cycle of formation of the projection elements 14c of the propagation direction characteristics modifier 14, similarly to the case of the embodiments I to III.

A two-dimensionally relatively positional relation between the size (grid width) of each reflection portion 16r and each projection element (square-pole-shaped projection) 14c is designed to block light from being incident on the notch portion between the flat regions 14g without obstructing light incident on each flat region 14g.

In this embodiment, a process of deflection of a flux to a frontal direction and convergence is two-dimensionally achieved as follows.

(1) A flux having clear directivity is outputted from the emitting surface 5 of the light guide plate 1 with emitting directivity. As described above, the preferential propagation direction of this flux is generally inclined at an angle of about 60 to 80° with respect to a normal extending from the emitting surface 5. The flux is diffused to some extent in a propagation direction with respect to both of a section orthogonal to the lamp and a section parallel to the lamp. In general, diffusion of the flux in a propagation direction occurs more largely with respect to the latter section (See FIGS. 1, 6 and 12).

(2) The output flux is incident on the reflection portions 16r or the window portions 16w after having been transmitted through the inside of the reflection pattern sheet 16 (or directly incident when the reflection portions 16 are formed on the inside of the reflection pattern sheet 15). The flux incident on the reflection portions 16r is reflected inwards. This reflected light and a small quantity of light reflected from the window portions 16w are given an opportunity of incidence on the window portions 16w again through a process including reflection by the inside surface of the reflection pattern sheet 16, reflection by the emitting surface 5, incidence on the light guide plate 1 again and output from the emitting surface 5 again. In this manner, the reflected light is utilized through a recycling process.

(3) The flux having been transmitted through the reflection pattern sheet 16 directly or through the above recycling process is obliquely incident on the flat region 14g of each square-pole-shaped projection 14c. In other words, a structure and arrangement of the propagation direction characteristics modifier 14 and those of the reflection pattern sheet 16 are designed such that a path of a flux transmitted through the reflection pattern sheet 16 and a position and a size of each flat region 14g are two-dimensionally matched with each other.

When the light is obliquely incident on the flat regions 14g, the degree of parallelization of the flux in a propagation direction is improved by the converging action which has been described with reference to FIG. 6. Incidentally, light is blocked by the reflection pattern sheet 16 from being incident on a notched portion (uneffective area) between the flat regions 14g.

(4) The flux obliquely incident on the flat regions 14g of the propagation direction characteristics modifier 14 (it is to be noted that this flux is two-dimensionally diffused in a propagation direction) is reflected by three reflective deflection surfaces 14b, 14e, 14f of the square-pole-shaped element 14c and is deflected to around a frontal direction. In reflection by the reflective deflection surface 14b, the flux is substantially totally reflected. The degree of parallelization of the flux is not degraded due to the reflection by these reflective deflection surfaces 14b, 14e, 14f.

(5) The flux deflected to around the frontal direction is incident on the outside surface of the propagation direction characteristics modifier 14 at substantially right angles therewith, and is radiated as an illumination flux to the outside air layer. This process corresponds to a propagation of a flux from a high refractive index medium to a low refractive index medium. However, since light is incident on the outside surface at substantially right angles therewith in a two-dimensional sense, diffusion of the flux (degradation of the degree of parallelization) hardly occurs not only in a section orthogonal to the lamp but also in a section parallel to the lamp. Consequently, in this embodiment, the deflection of the flux and the improvement in the degree of parallelization are two-dimensionally achieved.

Embodiments VIII and IX

Figures 19A, 19B:
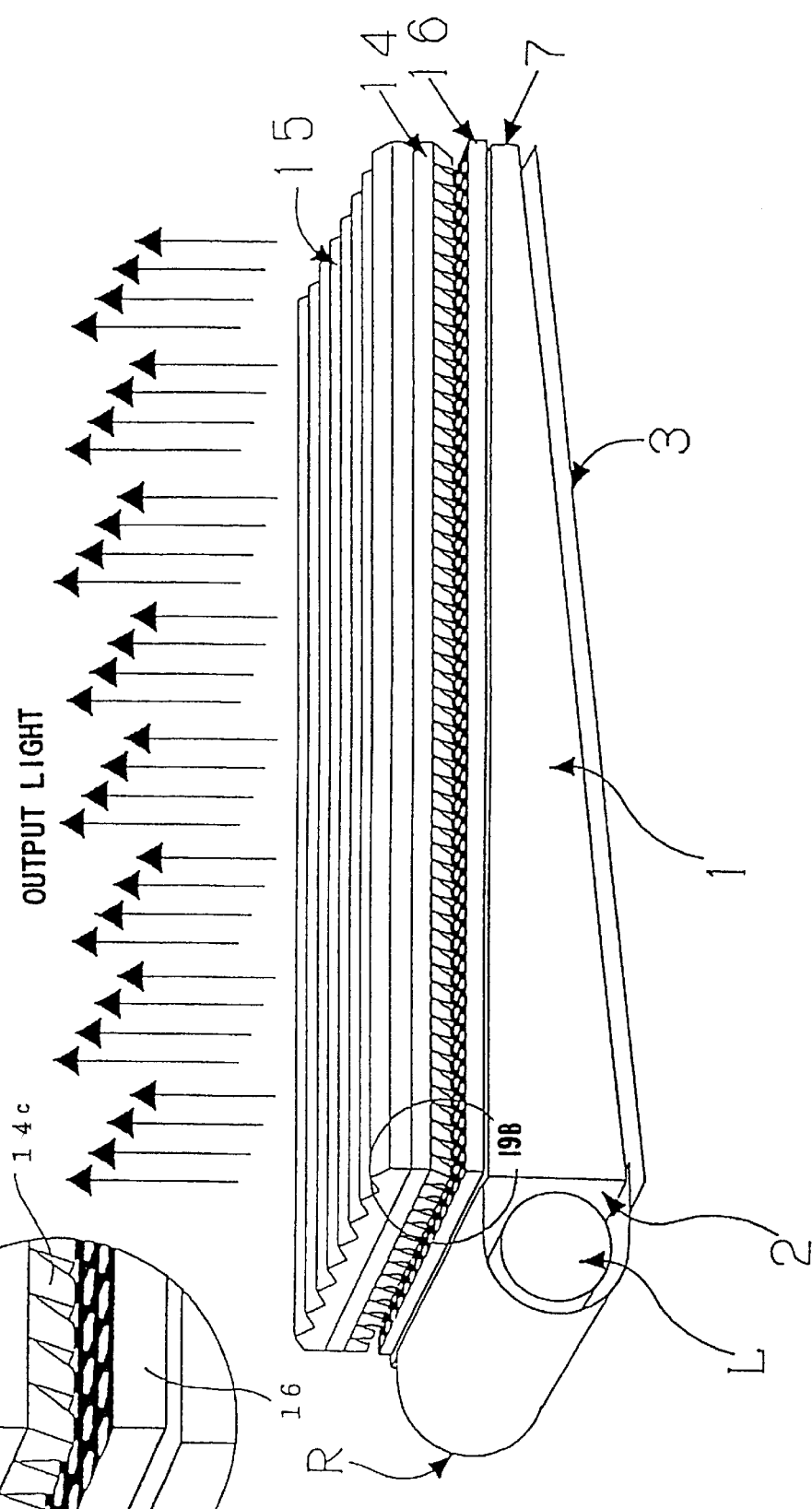
FIG. 19A is a sketch showing an overall arrangement of an embodiment VIII together with an encircled portion shown on an enlarged scale in FIG. 19B.
Figures 20A, 20B:
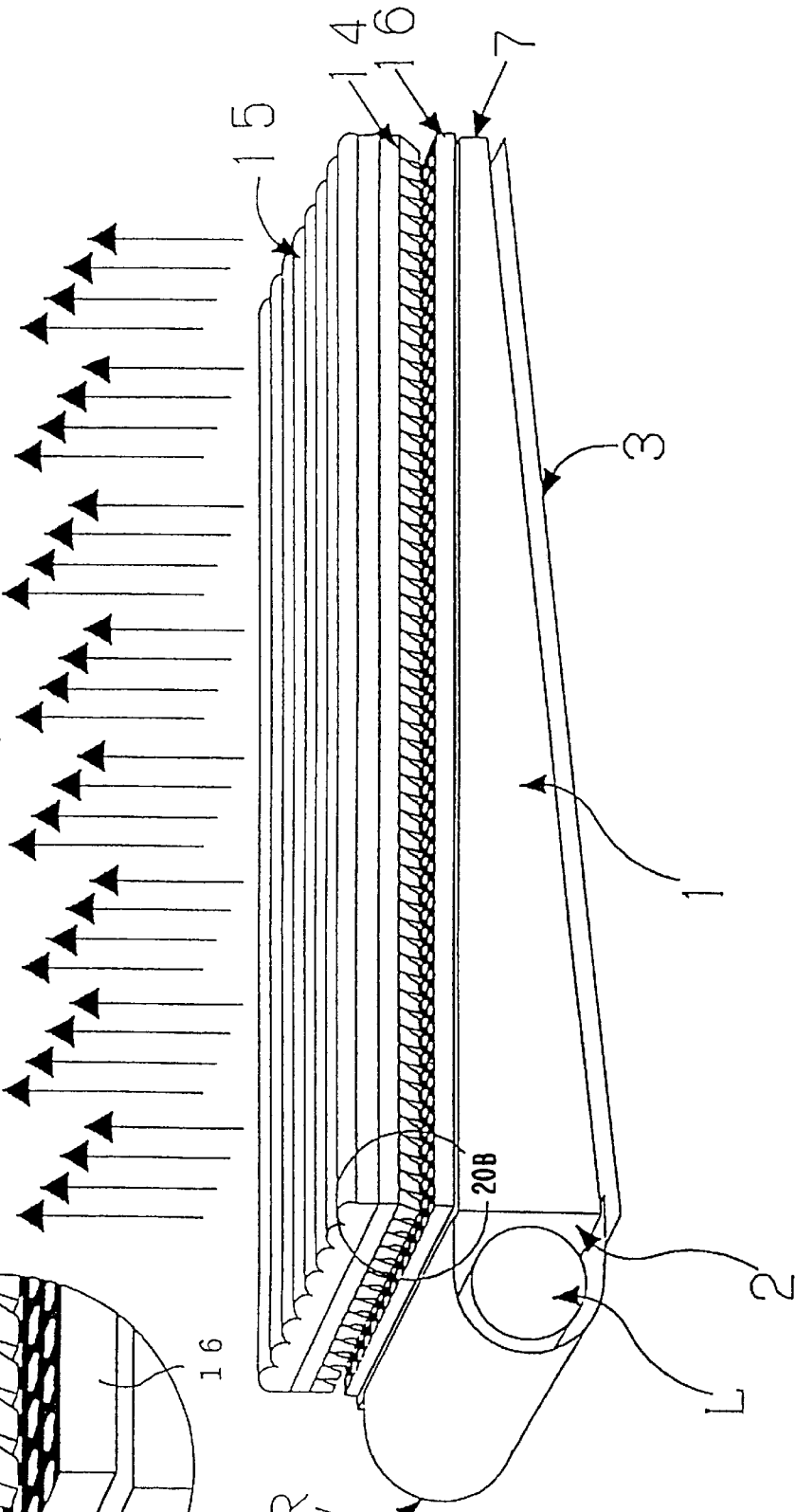
FIG. 20A is a sketch showing an overall arrangement of an embodiment IX together with an encircled portion shown on an enlarged scale in FIG. 20B.

FIGS. 19A through 20B show overall arrangements of these embodiments together with an encircled portions shown on an enlarged scale in FIGS. 19B and 20B, respectively. According to each embodiment, a prismatic groove array 15 (embodiment VIII) or a cylindrical lens 15 (embodiment IX) lined up in a direction orthogonal to the lamp is formed on an outside surface of a propagation direction characteristics modifier 14, while a structure basically similar to that in the embodiment VII is applied to this embodiment. A repetitive description of a structure and a function common to those in the embodiment VII will be omitted.

The prismatic groove array 15 or the cylindrical lens 15 is basically similar in structure and function to that used in the embodiment II or III. However, since the projection elements of the propagation direction characteristics modifier 14 are two-dimensionally arrayed differently from the embodiments II and III, it is to be noted that a function of preventing an illumination flux from being diffused in a lateral direction is multiply enhanced.

Embodiment X

According to this embodiment, the square-pole-shaped projection elements of the propagation direction characteristics modifier in the embodiment VII are replaced with conical-shaped projection elements. A pattern of reflection portions of a reflection pattern sheet is modified according to this replacement. Hereinafter, "conical-shaped projection elements" include cylindrical projection elements.

That is, as shown in an overall arrangement in FIG. 21A together with an encircled portion on an enlarged scale in FIG. 21B, a propagation direction characteristics modifier 14 in this embodiment includes a large number of conical-shaped projections 14c as projection elements forming a two-dimensional array. A distal end of each conical-shaped projection 14c has a flat region 14g. Each flat region 14g has a parallel relation to an emitting surface 5, and functions as an input surface which receives output light from the emitting surface 5, similarly to other embodiments.

In FIGS. 21A to 23B, it is to be noted that the propagation direction characteristics modifier is drawn as being slightly inclined to the emitting surface 5 so as to show the flat surface 14g.

A peripheral surface 14s of each conical-shaped projection 14c corresponds to a surface formed by smoothly curving of each of four surfaces 14a, 14b, 14e, 14f of each square-pole-shaped projection in the embodiments VII to IX. Its function continuously varies depending on a position in a peripheral direction. A peripheral surface portion on a relatively distant side (a side behind the rear) as viewed from the lamp L fulfills a function of deflection to a frontal direction in a section orthogonal to the lamp (assumes the role similar to that of the side surface 14b). This deflection is mainly carried out due to the total reflection.

When getting nearer to a peripheral surface portion on both the right sides as viewed from the lamp L, a function of deflection to a frontal direction in a section orthogonal to the lamp is reduced more than that in the peripheral surface portion on the relatively distant side described above, while a function of deflection to a frontal direction in a section parallel to the lamp is increased (assumes the role similar to that of the side surfaces 14e, 14f).

Then, when getting nearer to a peripheral surface portion on the close side (on this side) as viewed from the lamp L, the function of deflection in any section is rapidly made ineffective (assumes the role similar to that of the side surface 14a).

In consideration of a distribution of functions as described above, an inclination angle of a ridge line on the most distant side as viewed from the lamp L is preferably sized to be in the range of about 67 to 75° on the analogy of a case of using the square-pole shaped projections described above.

An inclination angle of a ridge line on the closest side as viewed from the lamp is preferably sized to be in the range of about 65 to 115°, particularly in the range of 90 to 110°, further limited to about 90°.

The reflection pattern sheet 16 is made of a transparent resin material such as PMMA, for instance, and is disposed on the inside of a propagation direction characteristics modifier 14. Reflection portions 16r are formed in a distributed state on one surface (an outside surface in this embodiment) according to a grid pattern of round bores.

Portions having no reflection portion 16r are provided as window portions 16w of a substantially circular or elliptical shape. The reflection portions 16r preferably take the shape of a layer or film consisting of Ag or Al having regular reflecting properties.

When the reflection portions 16r are formed on the inside surface of the reflection pattern sheet 16, a pattern of light and shade portions shown in FIGS. 21A and 21B is not a pattern of the reflection portions and the window portions themselves, and represents a pattern of light and shade portions appeared on the outside surface of the reflection pattern sheet 16.

The reflection pattern sheet 16 is provided to block output light from the emitting surface 5 of the light guide plate 1 from being incident on a notch portion (uneffectively area) other than the flat region 14g of each projection element. Accordingly, a cycle of formation of the window portions 16w is designed to be equal with a cycle of formation of the projection elements 14c of the propagation direction characteristics modifier 14, similarly to the case of the other embodiments.

A two-dimensionally relatively positional relation between the size of each reflection portion 16r and each projection element (conical-shaped projection) 14c is designed to block light from being incident on the notch portion between the flat regions 14g without obstructing light incident on the flat regions 14g.

In this embodiment, a process of deflection of a flux to a frontal direction and convergence is two-dimensionally achieved as follows.

(1) A flux having clear directivity is outputted from an emitting surface of a light guide plate 1 with emitting directivity at an angle of about 60 to 80° with respect to a normal extending from the emitting surface. This flux is diffused to some extent in a propagation direction with respect to both of a section orthogonal to the lamp and a section parallel to the lamp. As described above, diffusion of the flux with respect to the latter section largely occurs in general.

(2) The output flux is incident on the reflection portions 16r or the window portions 16w after having been transmitted through the reflection pattern sheet 16 (directly incident when the reflection portions 16r are formed on the inside of the reflection pattern sheet 16). The flux incident on the reflection portions 16r is reflected inwards.

This reflected light and a small quantity of light reflected from the window portions 16w are given an opportunity of incidence on the window portions 16w again through a process including reflection by the inside surface of the reflection pattern sheet 16, reflection by the emitting surface, incidence on the light guide plate 1 again and output from the emitting surface 5 again. In this manner, the reflected light is utilized through a recycling process.

(3) The flux transmitted through the reflection pattern sheet 16 directly or through the above recycling process is obliquely incident on the flat region 14g of each conical-shaped projection 14c. When the flux is obliquely incident on the flat regions 14g, the degree of parallelization of the flux in a propagation direction is improved. The flux is blocked by the reflection pattern sheet 16 from being incident on a notch portion (uneffective area) between the flat regions 14g.

(4) The flux obliquely incident on the flat regions 14g of the propagation direction characteristics modifier 14 (it is to be noted that this flux is two-dimensionally diffused in a propagation direction) is reflected by any portion of the peripheral surface 14s of each conical-shaped projection 14c, is subsequently reflected according to the distribution of functions described above (a considerable portion is totally reflected), and is then deflected to around a frontal direction. The degradation of the degree of parallelization of the flux due to this reflection hardly occurs.

(5) The flux deflected to around the frontal direction is incident on the outside surface of the propagation direction characteristics modifier 14 at substantially right angles therewith, and is radiated as an illumination flux to an outside air layer. This process corresponds to a propagation of a flux from a high refractive index medium to a low refractive index medium. However, since the flux is incident on the outside surface at substantially right angles therewith in a two-dimensional sense, diffusion of the flux (degradation of the degree of parallelization) hardly occurs not only in a section orthogonal to the lamp but also in a section parallel to the lamp. Consequently, in this embodiment, the deflection of the flux and the improvement in the degree of parallelization are two-dimensionally achieved.

Embodiments XI and XII

Figures 22A, 22B:
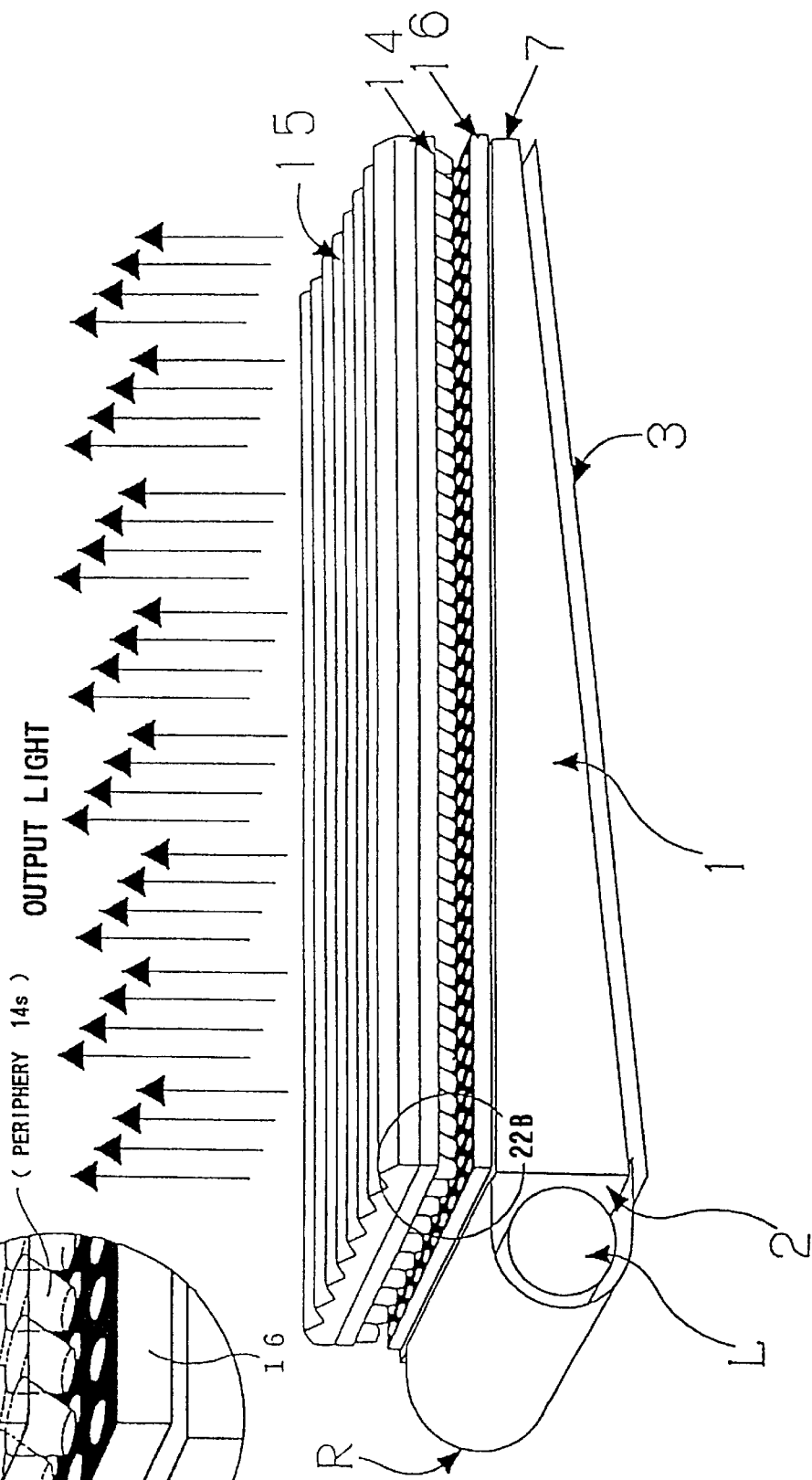
FIG. 22A is a sketch showing an overall arrangement of an embodiment XI together with an encircled portion shown on an enlarged scale in FIG.22B.

FIGS. 22A through 23A show overall arrangements of these embodiments together with an encircled portions shown on an enlarged scale in FIGS. 22B and 23B, respectively. According to these embodiments, a prismatic groove array 15 (embodiment XI) or a cylindrical lens 15 (embodiment XII) lined up in a direction orthogonal to the lamp is formed on an outside surface of a propagation direction characteristics modifier 14, while a structure basically similar to that in the embodiment X is applied to this embodiment. A repetitive description of a structure and a function common to those in the embodiment XII will be omitted.

The prismatic groove array 15 or the cylindrical lens 15 is basically similar in structure and function to that used in the embodiments II, III, VIII and IX. Since projection elements (conical-shaped projections) of the propagation direction characteristics modifier 14 in these embodiments are two-dimensionally arrayed, similarly to those in the embodiments VIII and IX, it is to be noted that a function of preventing an illumination flux from being diffused in a lateral direction is multiply enhanced.

Although twelve enhancements have been described above, the present invention is not limited to these embodiments. For instance, the present invention may be modified as follows.

(1) The light guide plate 1 with emitting directivity may not be made of the light scattering and guiding material. For instance, it may be made of a transparent optical material having a surface provided with fine irregularities for restraining the total reflection.

(2) The reflection pattern sheet used in the embodiments X to XII may be replaced with a reflection pattern formed on the emitting surface of the light guide plate, similarly to the embodiments IV to VI.

(3) The square-pole-shaped projections in the embodiments VII to XII may taken the shape of a square pyramid, instead of a normal square pole shape. That is, "the square-pole-shaped projections" in the present invention include square pyramid-shaped projections.

The pole-shaped projections in the embodiments X to XII may take the shape other than a conical pole and a square pole, as long as these projections fulfill a function of deflection to a frontal direction due to the total reflection at least in a section orthogonal to the lamp. The deflection may not be always based on the total reflection.

The shape of the pole-shaped projections includes an elliptical conical shape flat in a direction parallel to the lamp, a quasi-square pole shape expanded to the lateral side as viewed from the lamp side, and a polygonal pole shape (including a polygonal pyramidal shape) such as a pentagonal pole and a hexagonal pole.

(4) The prismatic groove array or the cylindrical lens array 15 is integrally formed on the outside surface of the propagation direction characteristics modifier 14 used in the embodiments II to IV, V, VI, VIII, IX, XI and XII. However, this structure may be replaced with the following structures, for instance.

The propagation direction characteristics modifier 14 having the flat outside surface used in the embodiment I and the prism sheet having the prismatic groove array or the cylindrical lens array formed only on one surface may be used in separate layers. These elements may be bonded together in use.

(5) The propagation direction characteristics modifier and the reflection pattern sheet in each embodiment may be united with each other by means of bonding or the like in use.

(6) A surface light source device having an additionally increased area of an emitting surface may be formed by connecting a plurality of surface light source devices in each embodiment together so as to form one-dimensional or two-dimensional array.

As has been described in detail in the foregoing, according to the characteristics of the present invention, it is possible to provide a surface light source device of side-light type which includes, in combination, the propagation direction characteristics modifier simultaneously fulfilling the action of deflection to a frontal direction and the action of convergence (an action of improving the degree of parallelization), and the reflection pattern means for controlling light incident on the propagation direction characteristics modifier, and concentratedly radiates a bright illumination flux with a high degree of parallelization to a frontal direction.

What is claimed is:

1. A surface light source device of side-light type, comprising:

a light guide plate with emitting directivity;

a light supply means disposed along a side end surface of said light guide plate;

a propagation direction characteristics modifier disposed along an emitting surface of said light guide plate; and a reflection pattern means for controlling light incident on said propagation direction characteristics modifier;

wherein said propagation direction characteristics modifier includes one-dimensional array of a large number of projection elements each having a distal end provided with a flat region serving as an input surface substantially parallel to said emitting surface;

at least a part of a side portion of each projection element has a reflective deflection surface having a function of deflection to a frontal direction based on reflection including the total reflection; and said reflection pattern means includes reflection portions formed in a distributed state so as to restrain a flux outputted with directivity from the emitting surface of said light guide plate from being incident on portions other than the flat regions of said projection elements.

2. A surface light source device of side-light type, comprising:

a light guide plate with emitting directivity;

a light guide supply means disposed along a side end surface of said light guide plate;

a propagation direction characteristics modifier disposed along an emitting surface of said light guide plate; and a reflection pattern means for controlling light incident on said propagation direction characteristics modifier;

wherein said propagation direction characteristics modifier includes one-dimensional array of a large number of ridge elements each having a distal end provided with a flat region serving as an input surface substantially parallel to said emitting surface;

said large number of ridge elements are lined up in parallel to said side end surface and respectively have reflective deflection surfaces each disposed at a side portion relatively distant from said light supply means and having a function of deflection to a frontal direction based on reflection including the total reflection; and said reflection pattern means includes a large number of reflection portions distributed in the shape of strips to restrain a flux outputted with directivity from the emitting surface of said light guide plate from being incident on portions other than the flat regions of said ridge elements.

3. A surface light source device of side-light type, comprising:

a light guide plate with emitting directivity;

a light guide supply means disposed along a side end surface of said light guide plate;

a propagation direction characteristics modifier disposed along an emitting surface of said light guide plate; and a reflection pattern means for controlling light incident on said propagation direction characteristics modifier;

wherein said propagation direction characteristics modifier includes one-dimensional array of a large number of projection elements each having a distal end provided with a flat region serving as an input surface substantially parallel to said emitting surface;

at least a part of a side portion of each projection element has a reflective deflection surface having a function of two-dimensional deflection to a frontal direction based on reflection including the total reflection; and said reflection pattern means includes reflection portions formed in a distributed state to restrain a flux outputted with directivity from the emitting surface of said light guide plate from being incident on portions other than the flat regions of said propagation direction characteristics modifier.

4. A surface light source device of side-light type, comprising:

a light guide plate with emitting directivity;

a light guide supply means disposed along a side end surface of said light guide plate;

a propagation direction characteristics modifier disposed along an emitting surface of said light guide plate; and a reflection pattern means for controlling light incident on said propagation direction characteristics modifier;

wherein said propagation direction characteristics modifier includes a two-dimensional array of a large number of pole-shaped projection elements each having a distal end provided with a flat region serving as an input surface substantially parallel to said emitting surface;

each of said large number of pole-shaped projection elements has at least one reflective reflection surface having a function of two-dimensional deflection to a frontal direction based on reflection including the total reflection; and said reflection pattern means includes a large number of reflection portions distributed in the shape of grid to restrain a flux outputted with directivity from the emitting surface of said light guide plate from being incident on portions other than the flat regions of said propagation direction characteristics modifier.

5. A surface light source device of side-light type, comprising:

a light guide plate with emitting directivity;

a light guide supply means disposed along a side end surface of said light guide plate;

a propagation direction characteristics modifier disposed along an emitting surface of said light guide plate; and a reflection pattern means for controlling light incident on said propagation direction characteristics modifier;

wherein said propagation direction characteristics modifier includes a two-dimensional array of a large number of square-pole-shaped projection elements each having a distal end provided with a flat region serving as an input surface substantially parallel to said emitting surface;

each of said large number of square pole-shaped projection elements has three reflective deflection surfaces formed so as to have a function of two-dimensional deflection to a frontal direction based on reflection including the total reflection; and said reflection pattern means includes a large number of reflection portions distributed in the shape of grid so as to restrain a flux outputted with directivity from the emitting surface of said light guide plate from being incident on portions other than the flat regions of said propagation direction characteristics modifier.

6. A surface light source device of side-light type, comprising:

a light guide plate with emitting directivity;

a light guide supply means disposed along a side end surface of said light guide plate;

a propagation direction characteristics modifier disposed along an emitting surface of said light guide plate; and a reflection pattern means for controlling light incident on said propagation direction characteristics modifier;

wherein said propagation direction characteristics modifier includes a two-dimensional array of a large number of conical-shaped projection elements each having a distal end provided with a flat region serving as an input surface substantially parallel to said emitting surface;

each of said large number of conical-shaped projection elements has a peripheral surface having a function of two-dimensional deflection to a frontal direction based on reflection including the total reflection; and said reflection pattern means includes a large number of reflection portions distributed in the shape of grid so as to restrain a flux outputted with directivitfrom the emitting surface of said light guide plate from being incident on portions other than the flat regions of said propagation direction characteristics modifier.

7. A surface light source device of side-light type according to any one of claims 1 to 6, wherein said reflection pattern means includes a reflection pattern sheet disposed between the emitting surface of said light guide plate and said propagation direction characteristics modifier, and said reflection portions are formed on said reflection pattern sheet.

8. A surface light source device of side-light type according to claim 7, wherein said light guide plate has a wedge-shaped cross section having a tendency to reduce thickness according as distance from said side end surface increases.

9. A surface light source device of side-light type according to any one of claims 1 to 6, wherein said reflection pattern means includes a reflection portion formed in a distributed state on the emitting surface of said light guide plate.

10. A surface light source device of side-light type according to claim 9, wherein said light guide plate has a wedge-shaped cross section having a tendency to reduce thickness according as distance from said side end surface increases.

11. A surface light source device of side-light type according to any one of claims 1 to 6, wherein said light guide plate has a wedge-shaped cross section having a tendency to reduce thickness according as distance from said side end surface increases.

* * * * *